(12) United States Patent
Liu et al.

(10) Patent No.: US 10,360,935 B1
(45) Date of Patent: Jul. 23, 2019

(54) DUAL WRITE HEATER FOR SLIDER SURFACE TOPOGRAPHY CONTROL IN DOUBLE PERPENDICULAR MAGNETIC RECORDING (PMR) WRITERS

(71) Applicant: Headway Technologies, Inc., Milpitas, CA (US)

(72) Inventors: Kowang Liu, Fremont, CA (US); Siu Yin Ngan, San Jose, CA (US); Qing Hua Zeng, Fremont, CA (US); Ellis Cha, San Ramon, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 15/986,261

(22) Filed: May 22, 2018

(51) Int. Cl.
  *G11B 5/127* (2006.01)
  *G11B 5/17* (2006.01)
  *G11B 5/60* (2006.01)
  *G11B 5/31* (2006.01)

(52) U.S. Cl.
  CPC .......... *G11B 5/6082* (2013.01); *G11B 5/1278* (2013.01); *G11B 5/17* (2013.01); *G11B 5/314* (2013.01); *G11B 5/3133* (2013.01); *G11B 5/3166* (2013.01); *G11B 5/3196* (2013.01); *G11B 5/607* (2013.01)

(58) Field of Classification Search
  CPC ....... G11B 5/1278; G11B 5/17; G11B 5/3133; G11B 5/314; G11B 5/3166; G11B 5/3196; G11B 5/607
  USPC .............. 360/123.03, 123.05, 123.06, 123.1, 360/123.11, 125.04, 125.05, 125.3, 360/125.31, 294.7, 237.1
  See application file for complete search history.

(56) References Cited

U.S. PATENT DOCUMENTS

| 6,665,136 B2 | 12/2003 | Clinton et al. |
| 7,633,711 B2 | 12/2009 | Hsiao et al. |
| 7,907,360 B2 | 3/2011 | Mak et al. |

(Continued)

OTHER PUBLICATIONS

Co-pending U.S. Appl. No. 15/942,640, filed Apr. 2, 2018, by Kowand Liu et al., "Magnetic Core and Coil Design for Double Perpendicular Magnetic Recording (PMR) Writers," 50 pgs.

(Continued)

*Primary Examiner* — Jefferson A Evans
(74) *Attorney, Agent, or Firm* — Saile Ackerman LLC; Stephen B. Ackerman

(57) ABSTRACT

A dual perpendicular magnetic recording writer is disclosed wherein first and second dynamic fly height (DFH) heaters WDFH1 and WDFH2, are formed in first and second writers, respectively, on a slider in a head gimbal assembly. In one embodiment, WDFH1 and WDFH2 have front sides that are recessed behind first and second back gap connections (BGC), respectively, and join together at their respective backsides behind the interconnect which connects a bucking coil and driving coil each symmetrically disposed about a center plane separating the two writers. In another embodiment with a separate bucking coil in each writer, WDFH1 and WDFH2 are formed behind separate interconnects. Magnetic spacing loss is reduced compared with a single DFH heater spread across both writers. Close point at touchdown in a cross-track direction and the size of the touchdown area are controlled by applying a WDFH1: WDFH2 power ratio from 100:0 to 0:100.

30 Claims, 14 Drawing Sheets

(56) References Cited

U.S. PATENT DOCUMENTS

| | | | | |
|---|---|---|---|---|
| 7,936,646 | B2 | 5/2011 | McCormack et al. | |
| 8,009,403 | B1 | 8/2011 | Mallary et al. | |
| 8,116,031 | B2* | 2/2012 | Alex | G11B 5/1278 360/123.02 |
| 8,218,264 | B1 | 7/2012 | Sasaki et al. | |
| 8,228,627 | B2* | 7/2012 | Koizumi | G11B 5/3123 360/125.01 |
| 8,274,758 | B2 | 9/2012 | Wu et al. | |
| 8,310,782 | B2* | 11/2012 | Song | G11B 5/1278 360/121 |
| 8,810,764 | B2 | 8/2014 | Nishida et al. | |
| 8,828,248 | B2 | 9/2014 | Mao et al. | |
| 8,836,059 | B2 | 9/2014 | Ahn et al. | |
| 8,848,309 | B2 | 9/2014 | Budde | |
| 9,019,646 | B2 | 4/2015 | Rausch et al. | |
| 9,171,561 | B1 | 10/2015 | Gadbois et al. | |
| 9,208,811 | B1 | 12/2015 | Kim et al. | |
| 9,218,830 | B2* | 12/2015 | Wu | G11B 5/3163 |
| 9,387,568 | B1 | 7/2016 | Ilaw et al. | |
| 9,613,642 | B1 | 4/2017 | Erden et al. | |
| 9,620,153 | B1* | 4/2017 | Sasaki | G11B 5/3123 |
| 9,754,612 | B2 | 9/2017 | Wei et al. | |
| 9,805,744 | B1 | 10/2017 | Xue et al. | |
| 9,865,301 | B1* | 1/2018 | Wiesen | G11B 27/36 |
| 9,934,796 | B2* | 4/2018 | Wei | G11B 5/315 |
| 2006/0145721 | A1 | 7/2006 | Ton-Churo | |
| 2008/0112080 | A1* | 5/2008 | Lengsfield | G11B 5/1278 360/125.04 |
| 2008/0291580 | A1* | 11/2008 | Yamashita | G11B 5/1278 360/314 |
| 2009/0015965 | A1* | 1/2009 | Sunwoo | G11B 5/3123 360/110 |
| 2010/0007986 | A1 | 1/2010 | Mak et al. | |
| 2011/0242701 | A1* | 10/2011 | Ohtake | B82Y 10/00 360/99.08 |
| 2013/0094104 | A1 | 4/2013 | Ngan et al. | |
| 2015/0162039 | A1 | 6/2015 | Wolf et al. | |
| 2016/0254014 | A1 | 9/2016 | Biskebom et al. | |
| 2017/0256275 | A1 | 9/2017 | Hutchinson et al. | |

OTHER PUBLICATIONS

Co-pending U.S. Appl. No. 15/912,821, filed Mar. 6, 2018, by Yuhui Tang et al., "Designs for Multiple Perpendicular Magnetic Recording (PMR) Writers and Related Head Gimbal Assembly (HGA) Process," 49 pgs.

Co-pending U.S. Appl. No. 15/913,167, filed Mar. 6, 2018, by Yue Liu, "Dual Perpendicular Magnetic Recording (PMR) Writer Base Structures and Mirror Imaged Asymmetrical Magnetic Core Shapes for Reduced Writer-Writer Spacing (WWS)," 52 pgs.

Co-pending U.S. Appl. No. 15/874,986, filed Jan. 9, 2018, by Kowang Liu et al., "Magnetic Core and Coil Design for Double Perpendicular Magnetic Reacording (PMR) Writers," 46 pgs.

* cited by examiner

DUAL WRITE HEATER FOR SLIDER SURFACE TOPOGRAPHY CONTROL IN DOUBLE PERPENDICULAR MAGNETIC RECORDING (PMR) WRITERS

RELATED PATENT APPLICATIONS

This application is related to the following: Ser. No. 15/874,986, filing date Jan. 19, 2018; Ser. No. 15/942,756, filing date Apr. 2, 2018; and Ser. No. 15/966,192, filing date Apr. 30, 2018; which are assigned to a common assignee and herein incorporated by reference in their entirety.

TECHNICAL FIELD

The present disclosure relates to a dual PMR writer that is configured to have two writers per slider wherein the better writer is identified during backend slider testing before pairing with a suspension, and integrating into a head gimbal assembly (HGA), and in particular to a dual dynamic fly height (DFH) heater design wherein a dedicated DFH heater coil is formed in each writer to guarantee no magnetic spacing loss occurs during a write process with the selected writer.

BACKGROUND

Perpendicular magnetic recording has been developed in part to achieve higher recording density than is realized with longitudinal recording devices. A PMR write head typically has a main pole layer with a small surface area (pole tip) at an ABS, and coils that conduct a current and generate a magnetic flux in the main pole such that the magnetic flux exits through the pole tip and enters a magnetic medium (disk) adjacent to the ABS. Magnetic flux is used to write a selected number of bits in the magnetic medium and typically returns to the main pole through two pathways including a trailing loop and a leading loop. The trailing loop has a trailing shield structure with first and second trailing shield sides at the ABS. The second (PP3) trailing shield arches over the driving coil and connects to a top yoke that adjoins a top surface of the main pole layer near a back gap connection. The leading loop includes a leading shield with a side at the ABS and that is connected to a return path (RTP) proximate to the ABS. The RTP extends to the back gap connection (BGC) and enables magnetic flux in the leading loop pathway to return from the leading shield at the ABS and through the BGC to the main pole layer. The double write shield (DWS) design that features the leading and trailing loops was invented for adjacent track erasure (ATE) improvement by reducing stray field in side shields and in the leading shield. Accordingly, a PMR head has a great advantage over LMR in providing higher write field, better read back signal, and potentially much higher areal density.

Perpendicular magnetic recording has become the mainstream technology for disk drive applications beyond 150 Gbit/in$^2$. Accordingly, the critical dimensions (CDs) of the PMR writer are continually shrinking. For example, the track width (TW) in today's writers is typically in a range of 10 nm to 100 nm. To achieve areal density in a hard disk drive (HDD) beyond 2 terabytes per platter (TBPP) for conventional PMR, dual PMR writer schemes have been proposed where the better writer is selected and then integrated into a HGA to provide improved area density capability (ADC) mean and sigma values. There may be <10 microns in cross-track writer-writer spacing (WWS) for a dual PMR writer at the ABS.

While it is advantageous to retain the heater coil layout from a single PMR scheme where a first DFH heater coil is in the read head, and a second DFH (WDFH) heater coil is placed in the write head, the symmetric (parabolic) heater protrusion profile with the close-point for WG protrusion at track center in a dual PMR writer may cause magnetic spacing loss, depending on the size of WWS, which results in burnishing of the recording head. Thus, there is a need for an improved dual PMR writer design that enables better control of WG protrusion than provided by a single WDFH heater coil without having adverse thermal-mechanical implications or system level integration issues in a head gimbal assembly (HGA).

SUMMARY

One objective of the present disclosure is to provide a DFH heater coil design for a dual PMR writer that enables improved control of WG protrusion when the better writer is integrated in a HGA such that the close point in a write process is shifted proximate to the cross-track position of the main pole tip in the selected writer.

Another objective of the present disclosure is to provide a method of adjusting WG protrusion for the selected writer according to the first objective so the close point may be shifted toward or away from the center track position, and the touchdown area on a magnetic recording medium may be increased or decreased.

These objectives are achieved by configuring a dual PMR writer (two writers per slider) where the better of the two writers is determined during backend slider/HGA level performance testing before integration into a HGA, and each writer comprises a dedicated DFH heater coil. Thus, a first DFH heater coil (WDFH1) is formed in a first PMR writer (writer 1), and a second DFH heater coil (WDFH2) is formed in a second PMR writer (writer 2). Each of the PMR writers has a main pole formed between a bucking coil and driving coil along a down-track direction, and magnetic flux is generated in the main pole of the selected writer by sending a write current through the bucking coil and an interconnect to the driving coil, or in the reverse direction. According to one embodiment, each of the bucking coil (BC) and driving coil (DC) is symmetrically disposed about a center plane that separates the two writers. In each of the BC and DC, there is a center portion having a substantially rectangular shape that extends from a front side of the coil to a backside where the center portion contacts an interconnect thereby enabling a write current to flow from the BC to DC, or in the reverse direction.

When writer 1 is the selected writer, write current Iw1 from a W1+ writer pad enters a first DC outer portion and flows to the DC center portion and through the interconnect to the BC center portion, and then through a BC first outer portion to a W1− writer pad thereby energizing the first main pole in writer 1. Alternatively, when writer 2 is selected for a write process, write current Iw2 from a W2+ writer pad enters a DC second outer portion and flows to the DC center portion and through the interconnect to the BC center portion, and then through the BC second outer portion to a W2− writer pad thereby activating the second main pole in writer 2.

According to a first embodiment, WDFH1 is positioned between the first main pole and the BC first outer portion in writer 1, and WDFH2 is formed between the second main pole and the BC second outer portion in writer 2. WDFH1 and WDFH2 are mirror images of each other with respect to the center plane and are separated except at a back end where they join behind the interconnect and are connected to a heater ground (H/G) pad. WDFH1 has an outer portion having a far end connected to a WDFH1+ heater pad, and a near end that adjoins an inner portion at a front side of WDFH1. The front side is recessed behind a first back gap connection (BGC) in writer 1, and may be aligned parallel to the ABS. The inner WDFH1 portion may have a serpentine shape in the form of an "S" where a front half is aligned orthogonal to the ABS and over the BC center portion on the writer 1 side of the center plane. The back half extends to a backside, but is a greater distance than the front half from the center plane in order to wrap around the interconnect, which is bisected by the center plane. Thus, a current to activate WDFH1 flows from the WDFH1+ pad through the outer portion to the inner portion, and then exits a back end at the center plane to the H/G pad. As a result, WG protrusion may be controlled such that the close point during touchdown of writer 1 during a write process is proximate to a plane that bisects the first main pole tip.

Likewise, WDFH2 has an outer portion having a far end connected to a WDFH2+ heater pad, and a near end that adjoins an inner portion at a front side of WDFH2, which is recessed behind a second back gap connection (BGC) in writer 2. The inner WDFH2 portion may have a serpentine shape in the form of an "S" where a front half is aligned orthogonal to the ABS and over the BC center portion on the writer 2 side of the center plane. The back half extends to a backside, but is a greater distance from the center plane than the front half in order to wrap around the interconnect and adjoin WDFH1 at a backside. A current to activate WDFH2 flows from the WDFH2+ pad through the outer portion to the inner portion, and then exits the backside at the center plane to the H/G pad. Accordingly, WG protrusion may be controlled such that the close point during touchdown of writer 2 during a write process is proximate to a plane that bisects the second main pole tip.

According to another embodiment where there is a separate bucking coil in each writer, the dual WDFH coil of the first embodiment is modified so that a front portion of each WDFH coil is formed behind a separate interconnect. The front sides of WDFH1 and WDFH2 also join at the center plane, and are joined at a backend that is connected to a ground (H/G) pad.

In both embodiments, the dual WDFH design enables flexibility in activating both WDFH1 and WDFH2 when either of writer 1 or writer 2 is selected for a write process. In particular, the power ratio of WDFH1:WDFH2 may vary from 100:0 to 0:100 and thereby shift the close point along the cross-track direction to further minimize magnetic spacing loss. Moreover, the WDFH1:WDFH2 power ratio may be used to adjust the size of the touchdown area during a write process.

DETAILED DESCRIPTION

The present disclosure relates to a dual DFH heater coil design wherein a dedicated WDFH is formed in each writer in a dual PMR writer on a slider to enable greater control of the close point and touchdown area during a write process with the selected writer. The close point is defined as the nearest point of the dual PMR writer on the ABS to the magnetic medium during a write process. A front portion of a layer such as a coil is closer to the ABS than a back portion or backend thereof. Dimensions of dual PMR writer components are expressed as a width in the y-axis (cross-track) direction, height in the x-axis direction, and thickness in the z-axis (down-track) direction. The term "front side" refers to a side of a layer facing the ABS while a "backside" faces away from the ABS. A far side of a coil is a greater distance than a near side of the coil from a center plane separating the two PMR writers.

Figure 1:
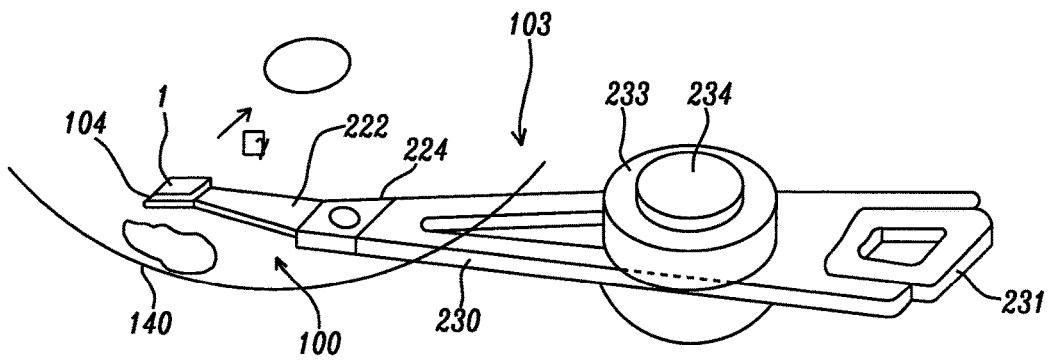
FIG. 1 is a perspective view of a head arm assembly of the present disclosure.

Referring to FIG. 1, a HGA 100 includes a magnetic recording head 1 comprised of a slider and a PMR writer structure formed thereon, and a suspension 103 that elastically supports the magnetic recording head. The suspension has a plate spring-like load beam 222 formed with stainless steel, a flexure 104 provided at one end portion of the load beam, and a base plate 224 provided at the other end portion of the load beam. The slider portion of the magnetic recording head is joined to the flexure, which gives an appropriate degree of freedom to the magnetic recording head. A gimbal part (not shown) for maintaining a posture of the magnetic recording head at a steady level is provided in a portion of the flexure to which the slider is mounted.

HGA 100 is mounted on an arm 230 formed in the head arm assembly 103. The arm moves the magnetic recording head 1 in the cross-track direction y of the magnetic recording medium 140. One end of the arm is mounted on base plate 224. A coil 231 that is a portion of a voice coil motor is mounted on the other end of the arm. A bearing part 233 is provided in the intermediate portion of arm 230. The arm is rotatably supported using a shaft 234 mounted to the bearing part 233. The arm 230 and the voice coil motor that drives the arm configure an actuator.

Figure 2:
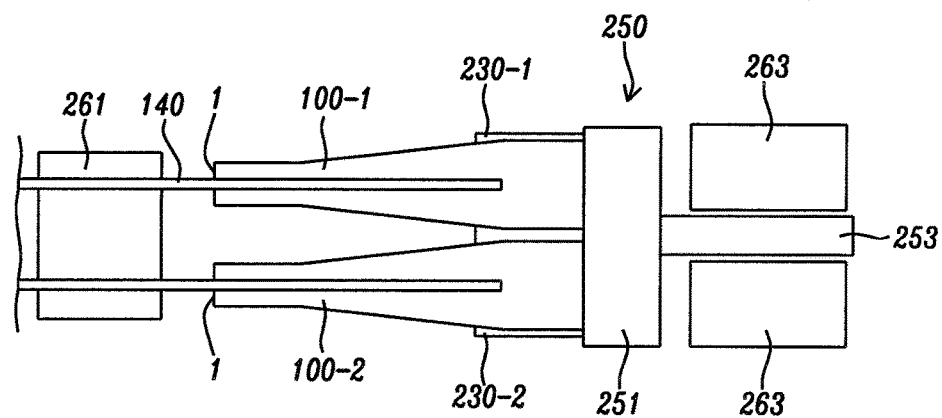
FIG. 2 is side view of a head stack assembly of the present disclosure.

Next, a side view of a head stack assembly (FIG. 2) and a plan view of a magnetic recording apparatus (FIG. 3) wherein the magnetic recording head 1 is incorporated are depicted. The head stack assembly 250 is a member to which a first HGA 100-1 and second HGA 100-2 are mounted to arms 230-1, 230-2, respectively, on carriage 251. A HGA is mounted on each arm at intervals so as to be aligned in the perpendicular direction (orthogonal to magnetic medium 140). The coil portion (231 in FIG. 1) of the voice coil motor is mounted at the opposite side of each arm in carriage 251. The voice coil motor has a permanent magnet 263 arranged at an opposite position across the coil 231.

Figure 3:
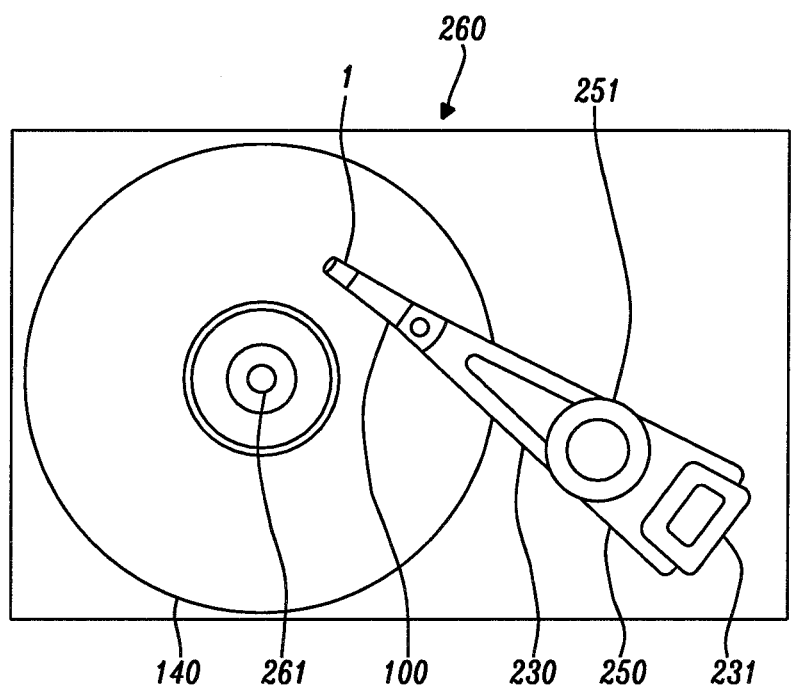
FIG. 3 is a plan view of a magnetic recording apparatus of the present disclosure.

With reference to FIG. 3, the head stack assembly 250 is incorporated in a magnetic recording apparatus 260. The magnetic recording apparatus has a plurality of magnetic media 140 mounted to spindle motor 261. For every magnetic recording medium, there are two magnetic recording heads arranged opposite one another across the magnetic recording medium. The head stack assembly and actuator except for the magnetic recording heads 1 correspond to a positioning device, and support the magnetic recording heads, and position the magnetic recording heads relative to the magnetic recording medium. The magnetic recording heads are moved in a cross-track of the magnetic recording medium by the actuator. The magnetic recording head records information into the magnetic recording media with a PMR writer element (not shown) and reproduces the information recorded in the magnetic recording media by a magnetoresistive (MR) sensor element (not shown).

Figure 4:
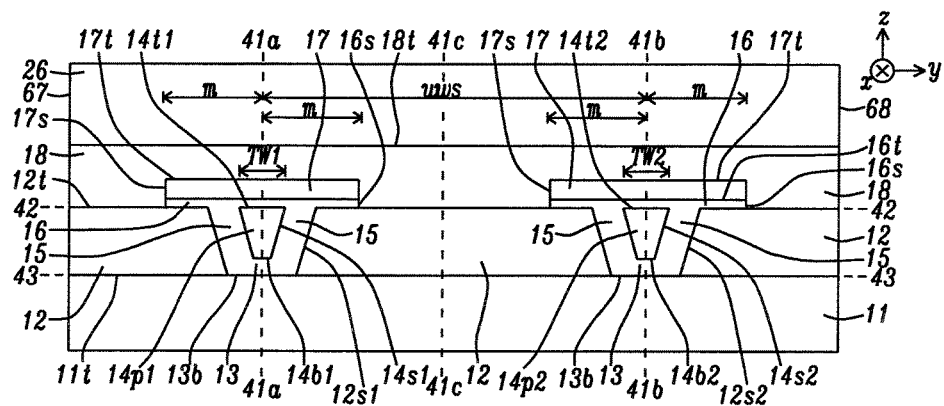
FIG. 4 is an ABS view of a dual PMR writer scheme wherein two main poles have a cross-track writer-writer spacing (WWS), and share a trailing shield and leading shield at the ABS according to an embodiment of the present disclosure.

In FIG. 4, an ABS view is illustrated of a dual PMR writer structure of the present disclosure where the first PMR writer (writer 1) is formed between side 67 and center plane 41$c$-41$c$, and has first main pole tip 14$p$1 and track width TW1 that are bisected by plane 41$a$-41$a$. The second PMR writer (writer 2) is formed between the center plane and side 68, and has a second main pole tip 14$p$2 and track width TW2 that are bisected by plane 41$b$-41$b$. The center plane is equidistant from planes 41$a$-41$a$ and 41$b$-41$b$ and is orthogonal to the ABS. First and second main pole tips are shown with a trapezoidal shape but may have different shapes in other embodiments. The first PMR writer with main pole layer 14$a$ having the first main pole tip is shown in a down-track cross-sectional view in FIG. 5A that is taken along plane 41$a$-41$a$. The second PMR writer with main pole layer 14$b$ having the second main pole tip is shown in FIG. 5B, which is a down-track cross-sectional view along plane 41$b$-41$b$. Writer-to-writer spacing (WWS) is the cross-track distance between plane 41$a$-41$a$ and plane 41$b$-41$b$.

Returning to FIG. 4, the main pole layers share a common trailing shield 18, and leading shield 11 that are bisected by center plane 41$c$-41$c$, and each main pole tip 14$p$1, 14$p$2 is surrounded by a gap layer that comprises leading gap 13, side gaps 15, and the write gap 16. Magnetic (hot seed) layer 17 is formed on each write gap. In one embodiment, hot seed layer side 17$s$ and write gap side 16$s$ are coplanar and formed a distance m from plane 41$a$-41$a$ in the first writer, and an equivalent distance m from plane 41$b$-41$b$ in the second writer. First and second main pole tips have sides 14$s$1 and 14$s$2, respectively, and top edges 14$t$1 and 14$t$2, respectively, which are formed at plane 42-42 that also includes a top surface 12$t$ of side shield layers 12. First and second main pole tips also comprise bottom edges 14$b$1, 14$b$2, respectively. Leading shield 11 has a top surface 11$t$ at plane 43-43 which also includes a bottom surface of the leading gap. Plane 42-42 and plane 43-43 are parallel to each other and are orthogonal to the center plane and to the ABS. Side gaps adjoin inner sides 12$s$ of the side shields.

In the exemplary embodiment, PP3 trailing shield 26 contacts a top surface of trailing shield layer 18 at the ABS. However, in other embodiments, the PP3 trailing shield may be recessed behind the ABS. Trailing shield layer 18 contacts hot seed layer side 17$s$ and top surface 17$t$, and write gap side 16$s$, and adjoins side shields 12 at plane 42-42. The all wrap around (AWA) shield design has outer sides 67, 68, and features side shields that adjoin the leading shield at plane 43-43.

In all embodiments, WWS is preferably less than 15 microns, and more preferably <10 microns so that the read-write offset also known as RWO (sensor-main pole tip 14$p$1 spacing, and sensor-main pole tip 14$p$2 spacing) in the down-track direction at the ABS is minimized. Smaller RWO means less track misregistration and better ADC potential. For example, if the sensor 6 (FIG. 5C) is centered at center plane 41$c$-41$c$, then RWO is effectively equal to ½ WWS at 0° skew. If RWO becomes too large, thermal-mechanical behavior of the dual PMR writer will deviate significantly from conventional single PMR writers. In particular, it is important to maintain the WG protrusion/read gap (RG) protrusion ratio and DFH heater placement found in current writers to avoid a substantial redesign of the dual PMR writer structure. As RWO increases, WG protrusion decreases at the center plane thereby increasing the risk of exposing the sensor to mechanical damage.

Figure 5A:
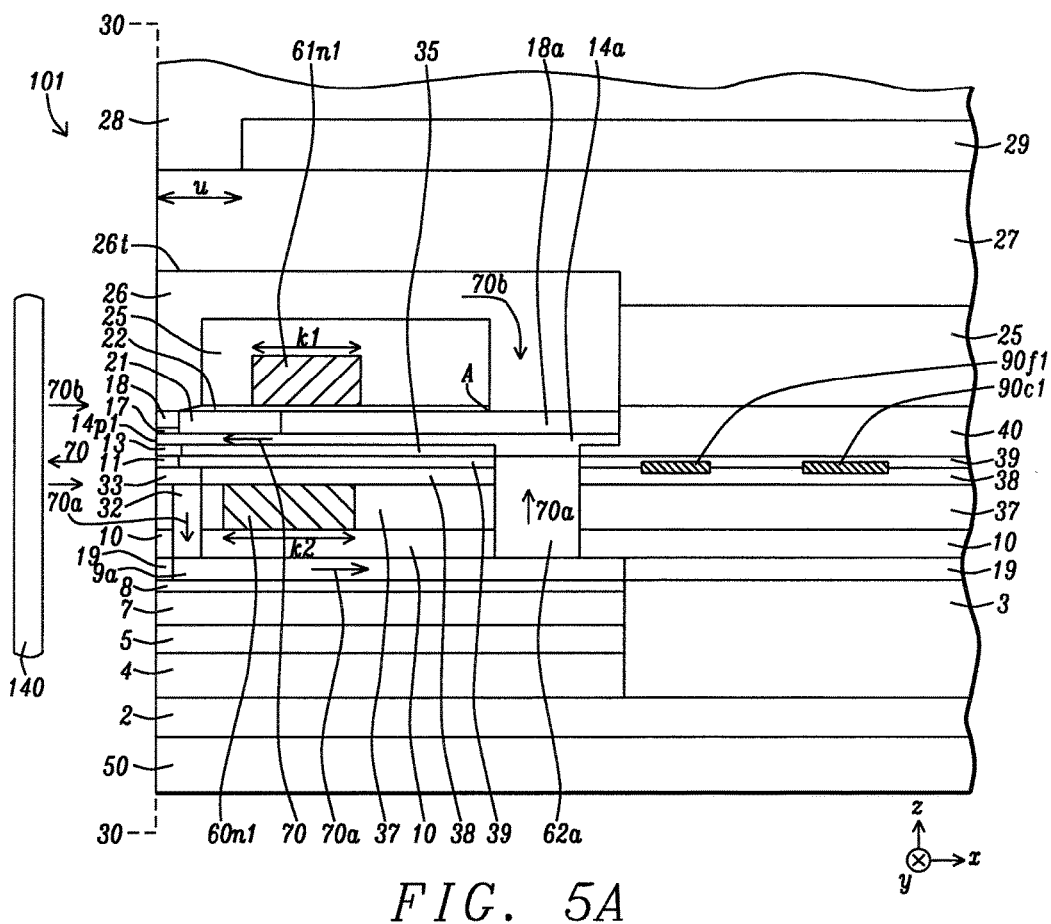
FIGS. 5A-5B are down-track cross-sectional views of the first and second writers, respectively, in FIG. 4 along a plane that bisects the first main pole layer (FIG. 5A), and along a plane bisecting the second main pole layer (FIG. 5B).
Figure 5B:
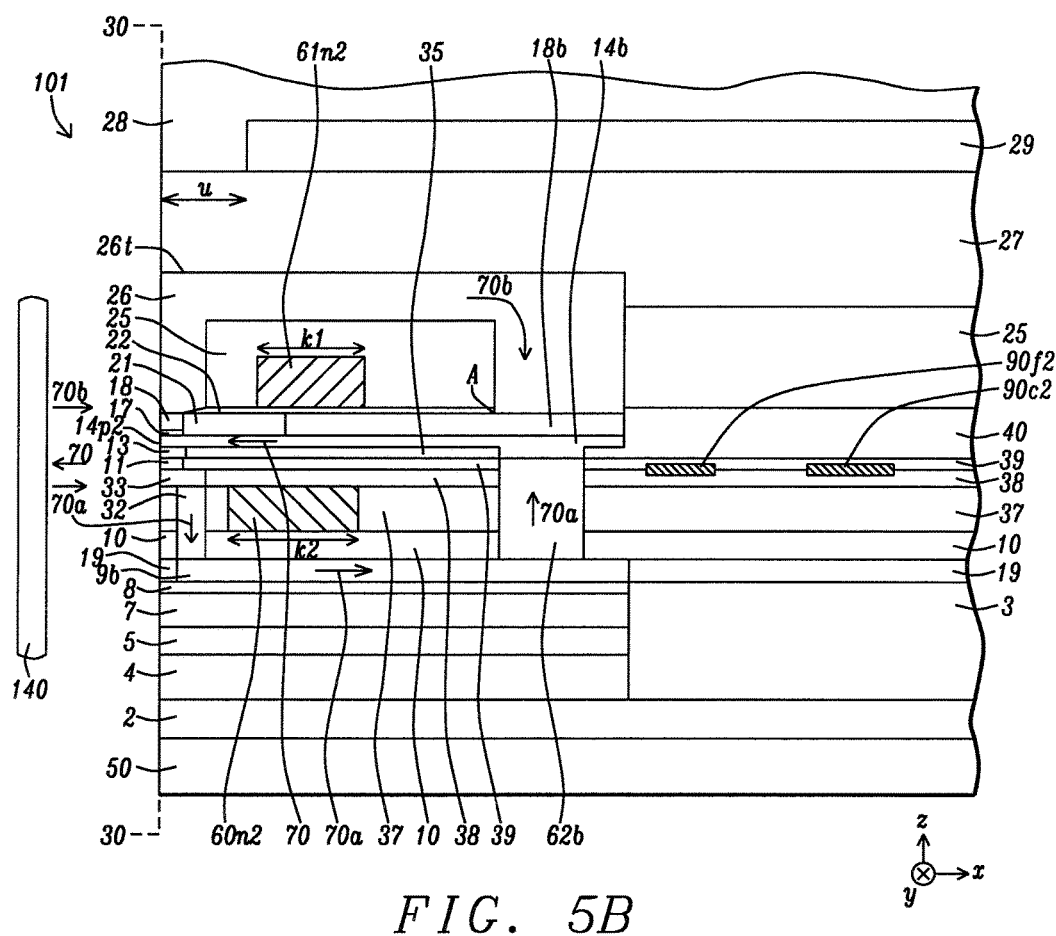

Referring to FIG. 5A, a combined read/write head 101 that serves as an example of the magnetic recording head 1 according to one embodiment of the present disclosure is shown at plane 41a-41a in FIG. 4. The combined read/write head is formed on a substrate 50 that may be comprised of AlTiC (alumina+TiC). Those skilled in the art will recognize that layers 2-8 represent the read head portion of the recording device while overlying layers represent writer 1 in the dual PMR structure described earlier. The substrate is typically part of a slider (not shown) formed in an array of sliders on a wafer. After the combined read/write head structure is completed, the wafer is sliced to form rows of sliders. Each row is typically lapped to afford an ABS before dicing to fabricate individual sliders for a HDD.

Read gap (RG) and write gap (WG) protrusion at the ABS 30-30 and toward magnetic medium 140 during a read or write process may be tuned by the placement of one or more DFH heater coils in one or more insulation (dielectric) layers in the PMR writer structure to control the extent of thermal expansion (protrusion), and by the choice of metal or alloy selected for the DFH heater coils since each DFH heater resistor material has a particular thermal and mechanical response to a given electrical input. Usually, the RG protrusion/WG protrusion ratio (gamma ratio) is around 1 to provide the best read/write performance and reliability. A first WDFH heater coil comprised of front and center portions 90f1, 90c1, respectively, is preferably positioned in one or more of the dielectric layers 38-40 behind BGC 62a in writer 1, and a second WDFH heater coil comprised of front and center portions 90f2, 90c2 is behind BGC 62b in writer 2 (FIG. 5B). The DFH heater (not shown) in the reader may be formed within dielectric layer 3.

A first insulation layer 2 that may be comprised of alumina or another dielectric material is disposed on substrate 50. There is a second insulation layer 3 formed on the first insulation layer and behind the read head layers 4-8. Above layer 2 is the S1 shield 4 that is comprised of NiFe or CoFeNi or the like, and extends from the ABS toward a back end of the read head. A read gap 5 is formed between the S1 shield 4 and S2A shield 7. A magnetoresistive element or sensor 6 (FIG. 5C) is formed at center plane 41c-41c in the read gap 5 at the ABS 30-30 and typically includes a plurality of layers (not shown) in which two ferromagnetic layers are separated by a non-magnetic layer. The magnetic moment direction in one of the ferromagnetic layers is fixed and provides a reference direction, and the moment direction in the other ferromagnetic layer may be rotated by the magnetic field from the media. Resistance across the read gap changes as the moment in the second ferromagnetic layer rotates. A "0" or "1" magnetic state can be defined depending on whether the two ferromagnetic layers are magnetically aligned in the same direction or in an antiparallel fashion. The non-magnetic layer in the sensor 6 may be an insulator such as MgO in a tunneling magnetoresistive (TMR) sensor.

In FIG. 5A, magnetic layer 7, insulation layer 8, and return path (RTP) 9a are sequentially formed on the read gap 5. In some embodiments, the RTP serves as the S2B shield in the read head while magnetic layer 7 is the S2A shield. In other embodiments, magnetic layer 7 is a top read shield layer having a stack represented by S2A shield/insulation layer/S2B shield. S2A and S2B layers may be made of the same magnetic material as in the S1 shield 4. Although RTP 9a is recessed from the ABS and formed within insulation layer 19, the RTP may serve as a flux return pathway in writer 1 by magnetically connecting S2C 32 with back gap connection (BGC) 62a in leading loop pathway 70a that includes leading shield 11, leading shield connector (LSC) 33, shield section (S2C) 32, the RTP, and the BGC in the exemplary embodiment that features a so-called rDWS BGC design. However, as explained in related patent application Ser. No. 15/966,192, other base PMR writer structures may be employed instead of the rDWS BGC scheme.

A bottom portion of BGC 62a contacts a top surface of RTP 9a, and a top BGC surface contacts a back portion of the bottom surface of main pole 14a. In the exemplary embodiment, there is a first insulation layer 10 formed on the RTP and adjoining the sides of S2C 32, and contacting the sides of a bottom portion of the BGC. A second insulation layer 37 is formed on the first insulation layer and has a bucking coil comprised of arm 60n1 formed within. Bucking coil 60 is completely displayed in the top-down view in FIG. 6B. The bucking coil is wound in series with an opposite polarity to that in the driving coil 61 in FIG. 6A to minimize direct coupling between the trailing shield 18 and driving coil.

Returning to FIG. 5A, a third insulation layer 38 is formed on insulation layer 37 behind LSC 33 and a fourth insulation layer 39 is on insulation layer 38 behind leading shield 11. Generally, insulation layers 10, 37-39 have a combined thickness essentially equal to that of BGC 62a. The LSC, S2C 32, BGC, and RTP 9a may be made of NiFe, CoFe, CoFeNi or the like with a saturation magnetization (Ms) value between 10 kiloGauss (kG) and 16 kG. There may be a bottom yoke 35 behind lead gap 13 and with a thickness essentially equal to that of the lead gap. Above the bottom yoke is the main pole layer 14a (with main pole tip 14p1 at the ABS 30-30) that is typically comprised of NiFe, CoFe, CoFeNi, or CoFeN, and preferably has a Ms between 19 kG and 24 kG. The first main pole (MP1) 14a has a back portion that connects with a top surface of BGC 62a to complete the leading loop. Leading shield (LS) 11 is separated from MP1 by lead gap 13. Flux 70 from the main pole enters magnetic medium 140 during a write process and returns in part as flux 70a though the leading loop comprised of LS 11, LSC 33, S2C 32, RTP 9a, and the BGC.

A first trailing shield (TS) layer 17 also known as the hot seed layer has a bottom surface formed on a write gap (not shown) at the ABS and extends a throat height distance away from the ABS 30-30 to an ABS facing (front) side of non-magnetic layer 21. A second TS layer 18 also extends from the ABS to layer 21, and like the first TS layer, may be made of CoFeN, CoFeNi, NiFe, or CoFe and is part of the trailing loop. The trailing loop for flux 70b to return to first main pole 14a further includes a third trailing shield portion named PP3 trailing shield 26 that arches over the driving coil including arm 61n1 to connect with a back portion 18a of the second TS layer above the first main pole back portion. The dual flux return pathway in FIG. 5A is employed to reduce STE. TS layer 18/18a and the PP3 trailing shield are typically made of materials having a Ms value between 16 kG and 19 kG. TS layer 18a is sometimes referred to as a top yoke (TY), and has a backside at point A that touches the inner corner of PP3 TS 26. Insulation layer 22 is formed on a portion of the non-magnetic layer 21 and top yoke.

Although PP3 TS 26 arches over driving coil arm 60n1 with a dome shape, the PP3 TS may have a substantially flat top surface in other designs. An insulation layer 25 is formed on the insulation layer 22 and fills the openings between the driving coil 60 (shown in FIG. 6A) and the PP3 trailing shield. A protection layer 27 covers the PP3 TS and is made of an insulating material such as alumina. Above the protection layer and recessed a certain distance from the ABS 30-30 is an optional cover layer 29 that is preferably comprised of a low CTE material such as SiC that serves to reduce the WG protrusion rate. SiC cover layer is recessed a distance u to avoid introducing a material at the ABS with different mechanical/etch resistance properties than adjacent layers that could adversely affect back end lapping and ion beam etching processes. Overcoat layer 28 is the uppermost layer in writer 1.

A key feature is that a first DFH heater coil (WDFH1) is recessed behind a backside of BGC 62a in writer 1. WDFH1 has a front side 90f1 and a center portion 90c1 and generally has a thickness between 400 Angstroms and 1000 Angstroms.

Referring to FIG. 5B, the second PMR writer in the combined read/write head 101 of the present disclosure is shown with a down-track cross-sectional view at plane 41b-41b in FIG. 1. All layers are retained from FIG. 5A except MP1 14a is replaced by second main pole (MP2) 14b, bucking coil arm 60n2 is formed within insulation layer 37 proximate to the ABS 30-30, and driving coil arm 61n2 is formed within insulation layer 25. The leading loop is comprised of leading shield 11, LSC 33, S2C 32, RTP 9b, and BGC 62b. The trailing loop includes first TS layer 17, second TS layer 18, PP3 trailing shield 26, and a back portion (top yoke) 18b of the second TS layer above a back portion of MP2. It should be understood that the shapes for the BGCs, trailing shield structure, and coils are not limited to those depicted herein. In other words, the shapes for the magnetic core including main poles and top and bottom yokes, driving coil, and bucking coil may be altered to optimize performance for PMR writer requirements that vary from one product to the next. Note that a second DFH heater coil (WDFH2) is recessed behind BGC 62b in writer 2 and has a front side 90f2 and a center portion 90c2.

Figure 5C:
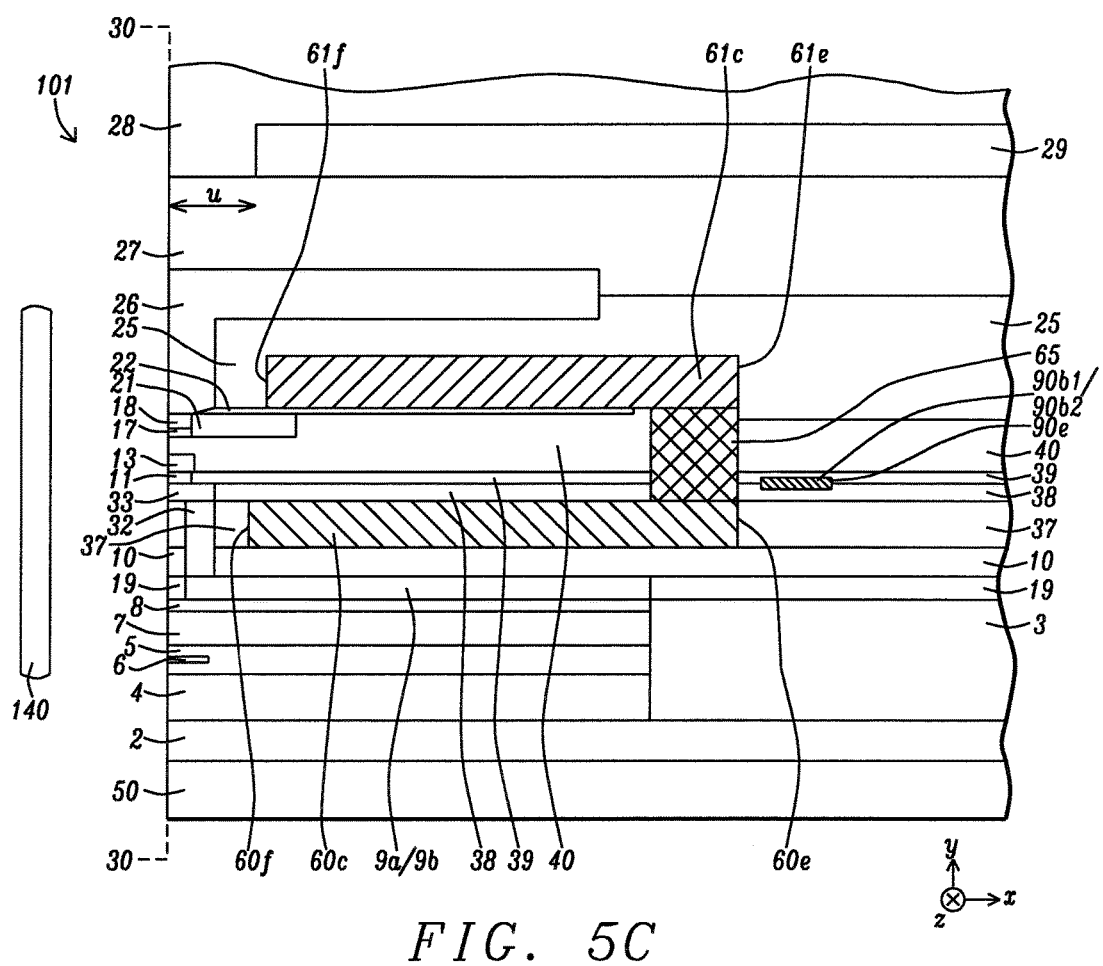
FIG. 5C is a down-track cross-sectional view along a center plane midway between the first writer and the second writer in FIG. 4.

Referring to FIG. 5C, a down-track cross-sectional view along center plane 41c-41c in FIG. 4 is illustrated according to an embodiment of the present disclosure. The trailing shield structure including PP3 TS 26 is present along with leading shield structure including LSC 33, S2C 32, and RTP 9a/9b. However, TS layer 18a/18b and the BGC are absent at the center plane where writer 1 adjoins writer 2. Driving coil (DC) center portion 61c is shown with front side 61f and backend 61e, and bucking coil (BC) center portion 60c is pictured with front side 60f and backend 60e. Interconnect 65 adjoins a bottom surface of DC center portion 61c proximate to backend 61e, and contacts a top surface of BC center portion 60c proximate to backend 60e. WDFH1 backside 90b1 and WDFH2 backside 90b2 join at a back end 90e thereof in dielectric layers 38-39 proximate to the backside of interconnect 65.

Figure 6A:
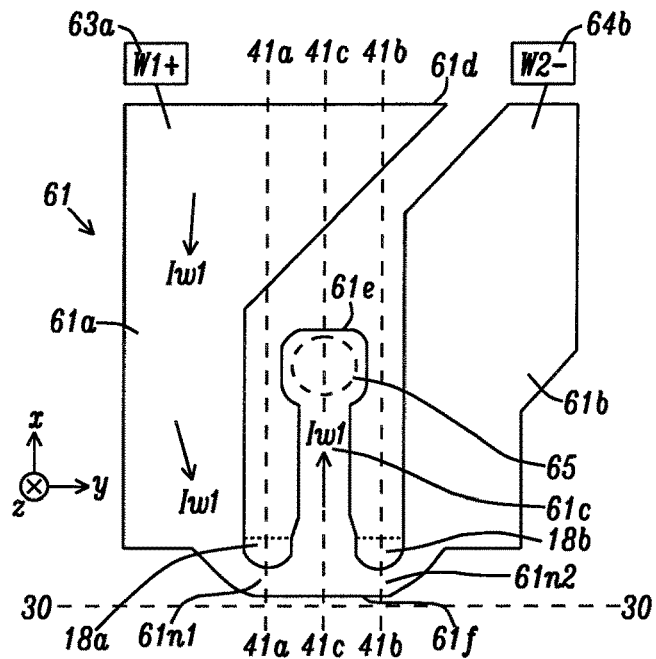
FIG. 6A shows a top-down view of a driving coil design in a dual PMR writer scheme wherein a first write current Iw1 is sent from a W1+ pad through a first driving coil (DC) outer portion to a center interconnect according to an embodiment of the present disclosure.
Figure 6B:
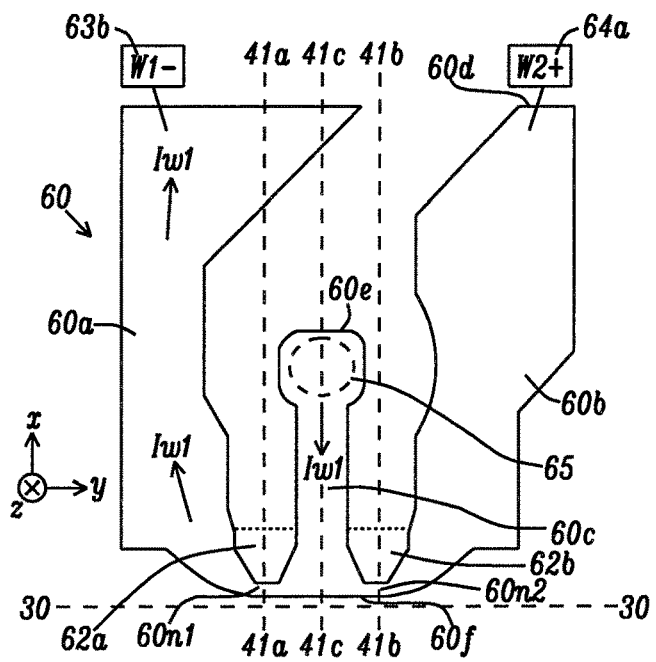
FIG. 6B shows a top-down view of a bucking coil design that complements the DC design in FIG. 6A where Iw1 flows from the center interconnect through a first bucking coil (BC) outer portion thereby energizing a first writer for a write process.

Referring to FIG. 6A and FIG. 6B, a general scheme is provided for write current flow in driving coil 61 and bucking coil 60 when writer 1 is selected for a write process that was previously described in related patent application Ser. No. 15/874,986. At the driving coil (DC) level in FIG. 6A, top yoke 18a (at plane 41a-41a) is behind DC arm 61n1 in writer 1, and top yoke 18b (at plane 41b-41b) in writer 2 is behind DC arm 61n2. Similarly, at the bucking coil (BC) level in FIG. 6B, BGC 62a in writer 1 at plane 41a-41a is behind BC arm 60n1, and BGC 62b at plane 41b-41b in writer 2 is behind BC arm 60n2.

When the write gate in the preamp of the HGA (shown in FIG. 10) is switched to "ON", write current Iw1 flows in a first circuit (FIG. 6A) from W1+ pad 63a in a counter-clockwise direction through DC first outer portion 61a and DC center portion 61c to interconnect 65 and then in a counterclockwise direction from the interconnect through BC center portion 60c and BC first outer portion 60a to W1-pad 63b (FIG. 6B) to energize the magnetic core comprised of BGC 62a and the underlying first main pole layer (not shown) in the first PMR writer.

In FIG. 6A, driving coil 61 may have a substantially U shape with a center portion 61c that extends from front side 61f to a backend 61e. Backside 61d of the outer portions 61a, 61b is a greater distance from the ABS 30-30 than backend 61e. DC arm 61n1 is formed between DC center portion 61c and DC first outer portion 61a, and DC arm 61n2 is formed between the DC center portion and DC second outer portion 61b. The DC center portion has a substantially rectangular shape aligned orthogonal to front side 61f.

Likewise, in FIG. 6B, bucking coil 60 may have a substantially U shape with a center portion 60c that extends from front side 60f to a backend 60e that is a smaller distance from the ABS 30-30 than backside 60d of BC outer portions 60a, 60b. BC arm 60n1 is formed between BC center portion 60c and BC first outer portion 60a, and BC arm 60n2 is formed between the BC center portion and BC second outer portion 60b. The BC center portion has a substantially rectangular shape aligned orthogonal to front side 60f.

Figure 7A:
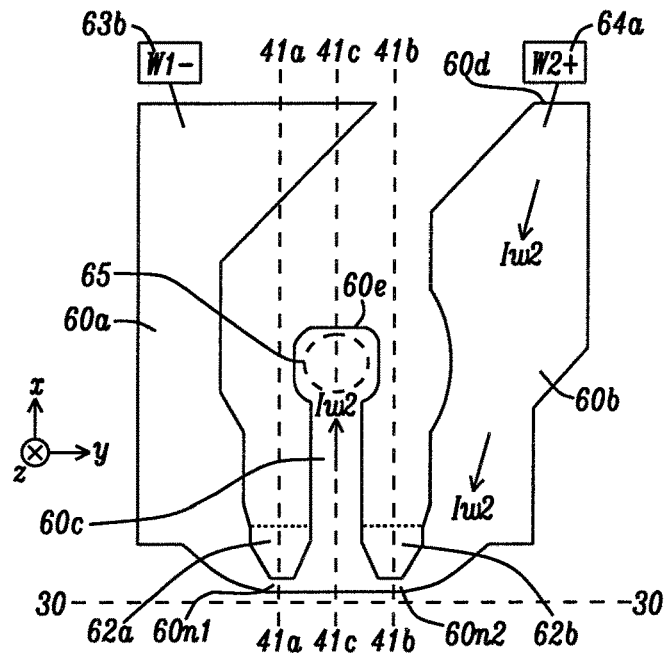
FIG. 7A shows a top-down view of a bucking coil design in a dual PMR writer scheme wherein a second write current Iw2 is sent from a W2+ pad through a second BC outer portion to the center interconnect according to an embodiment of the present disclosure.
Figure 7B:
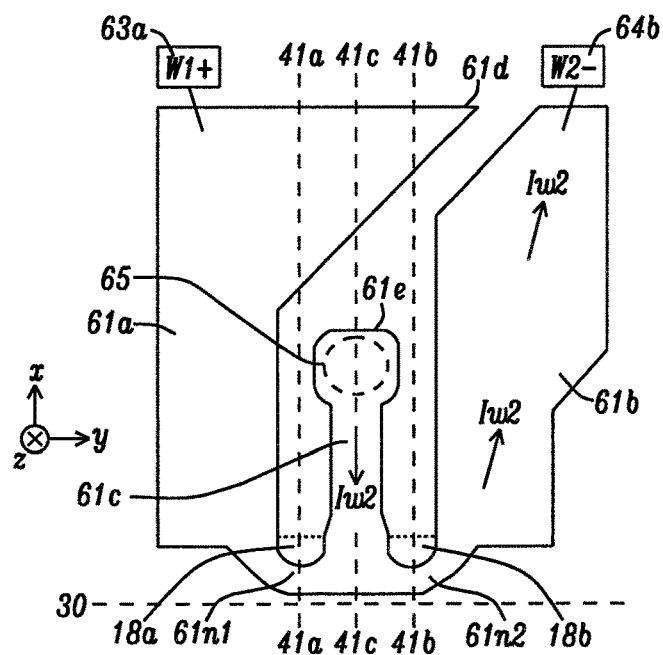
FIG. 7B shows a top-down view of a driving coil design that complements the BC design in FIG. 7A where Iw2 flows from the center interconnect through a second DC outer portion thereby energizing a second writer for a write process.

Referring to FIG. 7A, when writer 2 is selected for a write process, write current Iw2 flows in a second circuit from W2+ pad 64a in a clockwise direction through BC second outer portion 60b and BC center portion 60c to interconnect 65 and then in a counter-clockwise direction through DC center portion 61c and DC second outer portion 61b to W2-pad 64b (FIG. 7B) thereby energizing BGC 62b and the underlying second main pole layer (not shown). Both of the driving coil front side 61f and bucking coil front side 60f are recessed from the ABS 30-30 as shown in FIG. 5C. Furthermore, the cross-sectional area of each BC arm 60n1, 60n2 is substantially less than that of the BC center portion 60c, and the cross-sectional area of each DC arm 61n1, 61n2 is substantially less than that of the DC center portion 61c. The DC arms and BC arms may have height k1, k2, respectively, that are shown in FIG. 5A where k2>k1 and each of k1 and k2 may be about 1 micron.

Figure 8:
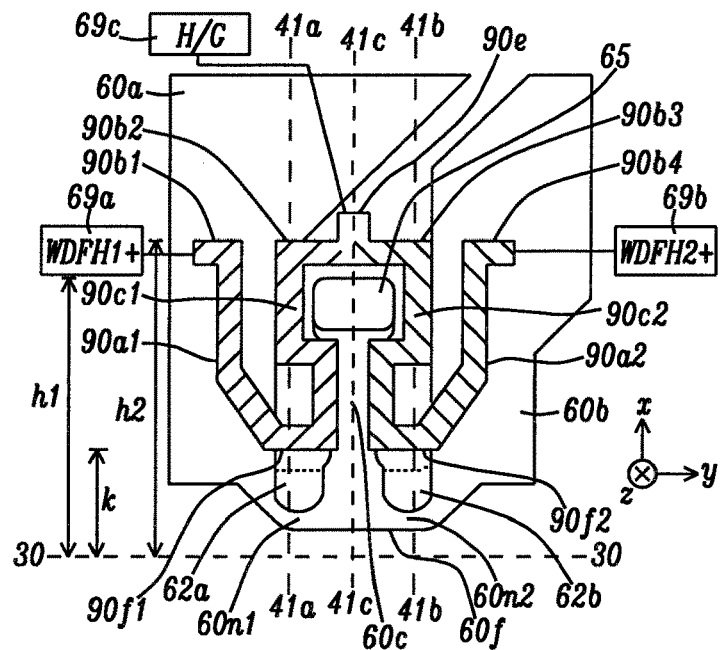
FIG. 8 is a top-down view of a dual DFH heater coil superimposed over a bucking coil according to an embodiment of the present disclosure.

Referring to FIG. 8, a dual WDFH heater coil according to a first embodiment of the present disclosure is shown above BC coil 60 described earlier, and comprises a first WDFH heater coil (WDFH1) and a second WDFH heater coil (WDFH2) that are separated except where they join together at back end 90e on center plane 41c-41c. WDHF1 has an outer portion 90a1 that extends from a front side 90f1 to a far end at backside 90b1, which is connected to a first heater pad WDFH1+ 69a. The front side is recessed to height k from the ABS 30-30 and is positioned behind BGC 62a in writer 1 with respect to the ABS. WDFH1 also has an inner portion 90c1 that may have a serpentine shape in the form of an S, and joins the outer portion at a near end at the front side and extends to a backside 90b2. According to one embodiment, a front half of the WDFH1 inner portion is aligned over the BC center portion 60c between center plane 41c-41c and plane 41a-41a while a back half of the WDFH1 inner portion wraps around interconnect 65 to join WDFH2 backside 90b3 at the center plane. Back end 90e is connected to heater ground (H/G) 69c, and adjoins the WDFH1 and WDFH2 backsides at height h2 from the ABS where h2 is a greater distance than height h1 at the backside of interconnect 65.

The present disclosure anticipates that other dual DFH heater coil shapes may be employed to provide the same benefits as described herein. In general, a front side of an alternative shape for WDFH1 (or WDFH2) is preferably behind the BGC in each writer and extends to a backend (where WDFH1 joins WDFH2) that is behind the interconnect. Preferably, WDFH1 is a mirror image of WDFH2 with respect to the center plane 41c-41c to enable equivalent WG performance when either writer 1 or writer 2 is the selected writer.

WDHF2 has an outer portion 90a2 that extends from a front side 90f2 to a far end at backside 90b4, which is connected to a second heater pad WDFH2+ 69b. The front side is recessed to height k from the ABS 30-30 and is positioned behind BGC 62b in writer 2. WDFH2 also has an inner portion 90c2 with a serpentine shape in the form of a backward S that joins a near end of the WDFH2 outer portion at front side 90f2 and extends to a backside 90b3. According to one embodiment, a front half of the WDFH2 inner portion is aligned over the BC center portion 60c between center plane 41c-41c and plane 41b-41b while a back half of the WDFH2 inner portion wraps around interconnect 65 to join WDFH1 backside 90b2 at the center plane. In one embodiment backsides 90b1-90b4 are all at height h2 from the ABS. WDFH1 is activated during a write process by sending a current from WDFH1+ pad 69a through WDFH1 outer portion 90a1, and then through inner portion 90c1 to backside 90b2 and out to H/G pad 69c. WDFH2 is activated during a write process by flowing a current from WDFH2+ pad 69b through WDFH2 outer portion 90a2, and then through inner portion 90c2 to backside 90b3 and out to H/G pad 69c. The present disclosure encompasses an embodiment where only WDFH1 is activated during a write process with writer 1, and only WDFH2 is activated for a write process with writer 2. In an alternative embodiment, WDFH1 and WDFH2 may be activated simultaneously with equal or different power levels as explained later to adjust the close point in a cross-track direction, and increase or decrease the touchdown area.

The dual DFH heater coil of the present disclosure may have a cross-track footprint up to 30 microns or 40 microns, depending on the cross-track footprint of the bucking coil. In other words, the WDFH1 and WDFH2 outer portions preferably do not extend a greater distance from center plane 41c-41c than the outer portions of the underlying bucking coil 60. The dual DFH heater coil may be comprised of Cu, W, or Ta and is preferably from 400 Angstroms to 1000 Angstroms thick. The recessed height k for front sides 90f1, 90f2 is proximate to 10 microns.

Figure 9:
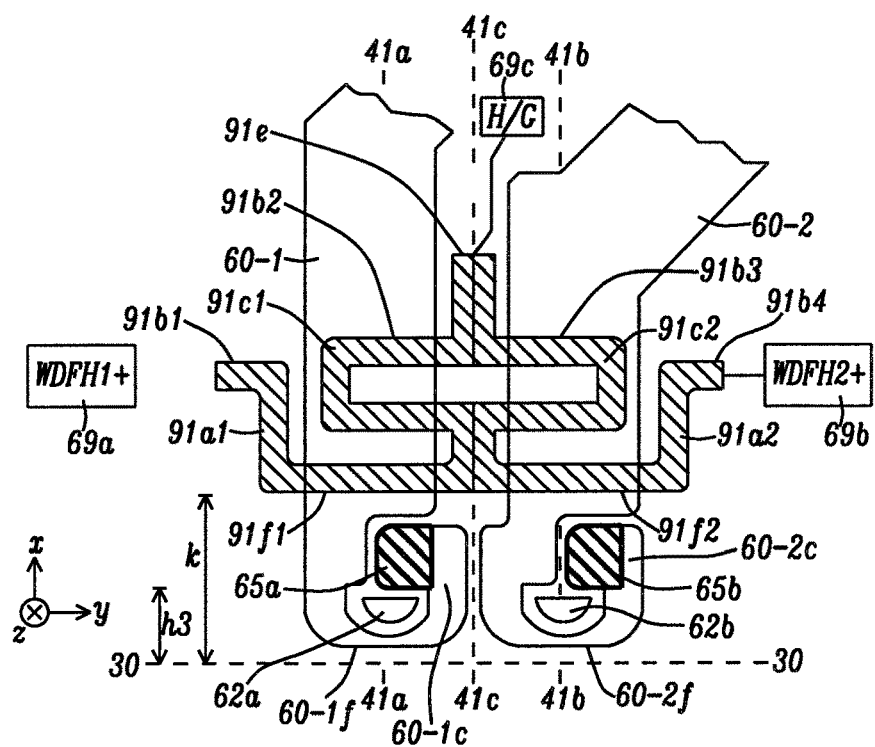
FIG. 9 is a top-down view of a dual DFH heater coil superimposed over a dual bucking coil design according to another embodiment of the present disclosure.

According to a second embodiment of the dual DFH heater coil of the present disclosure depicted in FIG. 9, the shape of WDFH1 and WDFH2 may be modified for alternative bucking coil designs. For example, in related patent application Ser. No. 15/966,192, various coil designs featuring separate bucking coils in writer 1 and writer 2 are disclosed. Therefore, WDFH1 and WDFH2 in the first embodiment may be modified to be compatible with a bucking coil layout where a first bucking coil 60-1 is formed in writer 1, and a second bucking coil 60-2 is in writer 2, and the bucking coils are completely separated. Furthermore, there may be a common driving coil (not shown) or separate driving coils above the bucking coil layout.

In the exemplary embodiment, each of the bucking coils 60-1, 60-2 has a 1 T scheme where front sides 60-1f and 60-2f, respectively, are recessed from the ABS 30-30. BGC 62a in writer 1 is recessed behind front portion 60-1f at plane 41a-41a, and BGC 62b in writer 2 is recessed behind front portion 60-2f at plane 41b-41b. There is a first interconnect 65a contacting a top surface of center portion 60-1c of bucking coil 60-1 at height h3, and a second interconnect 65b contacting a top surface of center portion 60-2c of bucking coil 60-2 at height h3. First and second interconnects may connect to a common driving coil or separate driving coils in each writer as indicated in related patent application Ser. No. 15/966,192.

In this embodiment, the entire dual DFH heater coil is formed behind interconnects 65a, 65b so that a front side 91f1 of WDFH1 and a front side 91f2 of WDFH2 are at a height k from the ABS 30-30 where k>h3. WDFH1 has an outer portion 91a with a far end at backside 91b1 that connects to the WDFH1+ writer pad 69a, and includes a front section comprising front side 91f1 that extends to a near end at center plane 41c-41c and is parallel to the ABS. Outer portion 91a2 of WDFH2 has a far end at backside 91b4 that connects to WDFH2+ writer pad 69b, and includes a front section comprising front side 91f2 that extends to a near end at the center plane and is parallel to the ABS. WDFH1 center portion 91c1 may have a serpentine shape and extends toward a back end of the dual PMR writer from the outer portion near end at front side 91f1 to a backside 91b2, which adjoins WDFH2 at backend 91e on the center plane. As in the previous embodiment, WDFH2 is preferably the mirror image of WDFH1 with respect to the center plane and has a center portion 91c2 with a serpentine shape starting at the outer portion near end at front side 91f2 to a backside 91b3 that adjoins WDFH1 at backend 91e. The backend is connected to ground pad H/G 69c.

WDFH1 is activated during a write process by sending a current from WDFH1+ pad 69a through WDFH1 outer portion 91a1, and then through center portion 91c1 to backside 91b2 and out to H/G pad 69c. WDFH2 is activated during a write process by flowing a current from WDFH2+ pad 69b through WDFH2 outer portion 91a2, and then through center portion 91c2 to backside 91b3 and out to H/G pad 69c. In some embodiments, only WDFH1 is activated during a write process with writer 1, and only WDFH2 is activated for a write process with writer 2. However, both WDFH1 and WDFH2 may be activated simultaneously with equal or different power levels in other embodiments to adjust the close point in a cross-track direction, and to control the size of the touchdown area. A write process with writer 1 comprises sending a write current (not shown) from bucking coil 60-1 through interconnect 65a to a first driving coil or a common driving coil. When writer 2 is selected for writing, the write process comprises flowing a write current (not shown) from bucking coil 60-2 through interconnect 65b to a second driving coil or the common driving coil.

Figure 10:
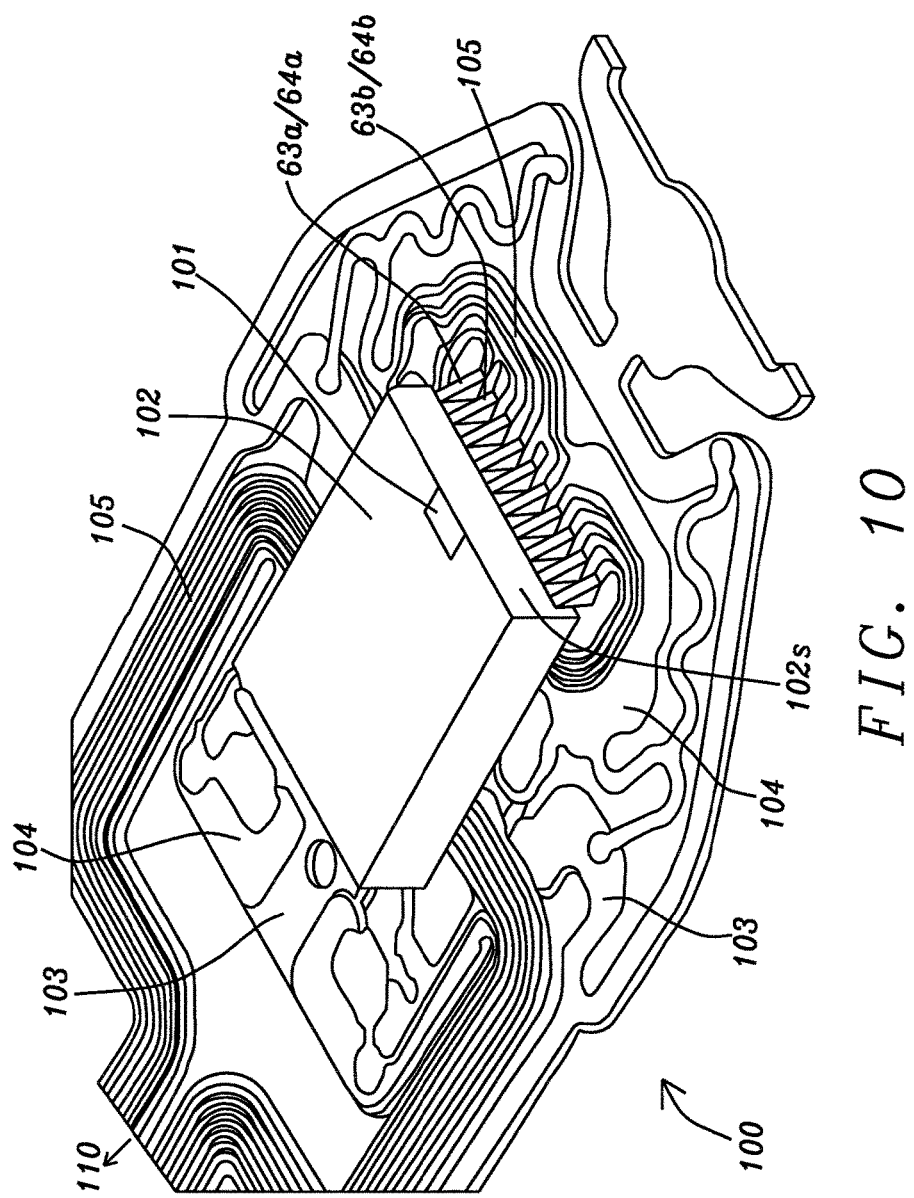
FIG. 10 is an oblique view of a slider on which a combined read/write head structure is mounted, and having adjoining pads and trace lines (wiring) formed on a suspension according to an embodiment of the present disclosure.

Referring to FIG. 10, HGA 100 is depicted and features suspension 103, an overlying dielectric layer (flexure) 104, and slider 102 formed thereon. The combined read/write head 101 comprised of the dual PMR writer of the present disclosure adjoins a top side of the slider facing away from the suspension. Pads including W1+ pad 63a, W1− pad 63b, W2+ pad 64a and W2-pad 64b are attached to slider side 102s. Trace lines 105 connect the plurality of pads to preamp 110. However, only the W1+ and W1− pads are connected to the preamp and only writer 1 is integrated in the HGA if the first writer is found to have better performance. Likewise, only the W2+ and W2-pads are connected to the preamp and only writer 2 is integrated in the HGA if the second writer has better performance. Connections between the pads and the combined read/write head are within the slider and not visible from this view.

Figure 11:
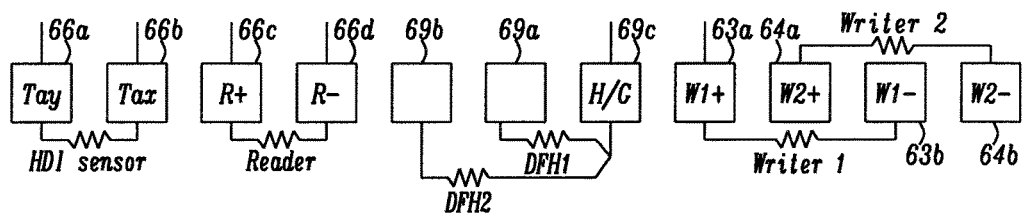
FIG. 11 is diagram showing one possible configuration for the plurality of pads on the slider in FIG. 10.

In FIG. 11, one embodiment of the pad layout is shown for a combined read/write head 101 having a single reader and a dual writer according to the present disclosure. Pads interface the writers, reader, two DFH heaters, and contact (HDI) sensors to the driving circuits through the trace lines in the HGA described previously. Pads 66a-66b control the contact sensor function, pads 66c-66d control the reader function, and pads 69a, 69b, and 69c are used to manage WDFH1, WDFH2, and H/G, respectively. After the better of the two writers is selected, only the first circuit comprised of pads 63a, 63b in writer 1, or the second circuit comprised of pads 64a, 64b in writer 2 is connected to trace lines 105a, 105b (FIG. 4) while the other of the first circuit or second circuit is disabled depending on whether writer 1 or writer 2, respectively, has better performance. Accordingly, the total number of functional pads is nine when a dual independent DFH heater mode is employed as shown in FIG. 11. Alternatively, there may be a parallel DFH heater mode (not shown) where the total number of functional pads is only 8.

The advantage of a dual PMR writer is that when track width (TW) shrinks below 100 nm for a single PMR writer, there is often considerable variation in performance from one writer to the next for a given target TW. We have found the mean ADC is improved by 2.4% and the sigma is tightened by 35.2% for the better writer in the dual PMR writer that is built with each of the first and second PMR writers having the same specifications as a single PMR writer.

Figure 12:
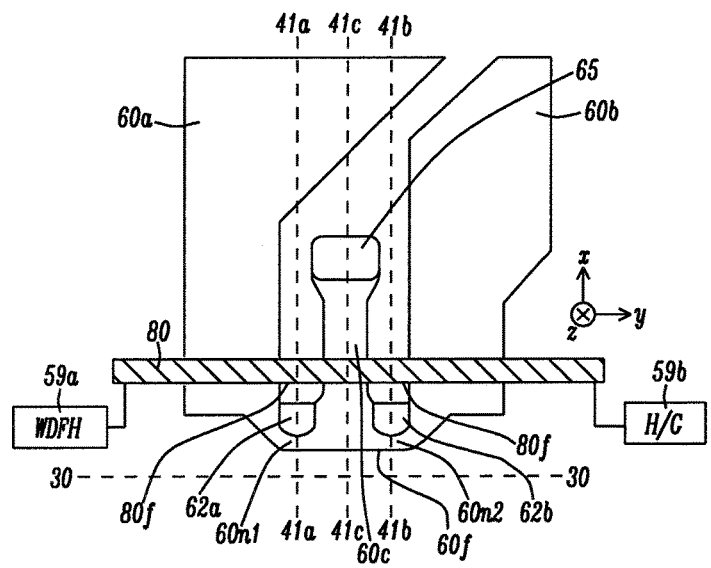
FIG. 12 is a top-down perspective of a single DFH heater coil formed over a bucking coil according to a process of record employed by the inventors.

In order to examine magnetic spacing loss in a dual PMR writer wherein the better writer is selected for integration in a HGA, an Ansys finite element modeling (FEM) study was performed. WG protrusion in writer 1 at plane 41a-41a and in writer 2 at plane 41b-41b with a single WDFH is up to 0.5 nm less than the maximum protrusion ($FH_{min}$) at the center cross-track position (plane 41c-41c) and this difference is referred to as magnetic spacing loss. First, a simulation that serves as a baseline measurement was performed to determine WDFH induced protrusion profile for a single WDFH coil disposed symmetrically on either side of a center plane between a BC coil and DC coil that were described previously regarding the first embodiment. A top-down view of the single WDFH used for this simulation is shown in FIG. 12. In particular, all components in the dual PMR writer in FIG. 8 are retained except WDFH1 and WDFH2 are replaced with WDFH 80 having a bar shape formed parallel to ABS 30-30. A front side 80f is recessed behind BGC 62a and BGC 62b, but is a closer distance to the ABS 30-30 than interconnect 65. A current used to activate WDFH 80 is sent from writer pad 59a to H/G pad 59b.

Figure 13A:
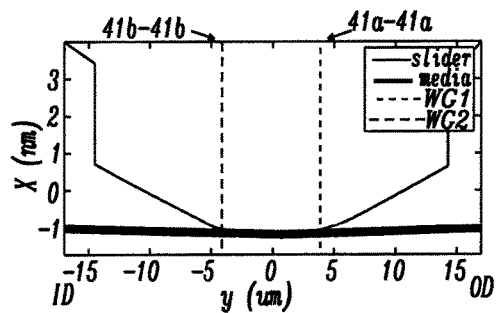
FIG. 13A, FIG. 14A, and FIG. 15A are write gap (WG) protrusion profiles for an inner writer in a dual PMR writer at inner diameter (ID), mid diameter (MD), and outer diameter (OD) of a recording disk, respectively.
Figure 13B:
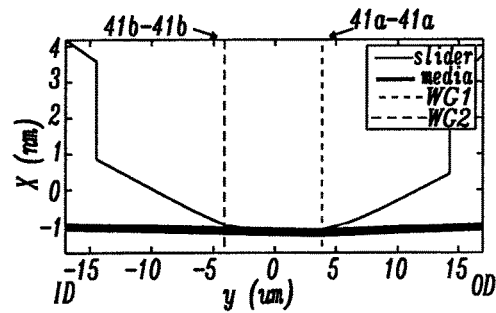
FIG. 13B, FIG. 14B, and FIG. 15B are WG protrusion profiles for an outer writer at ID, MD, and OD, respectively, in the dual PMR writer that has a single DFH heater coil.
Figure 14A:
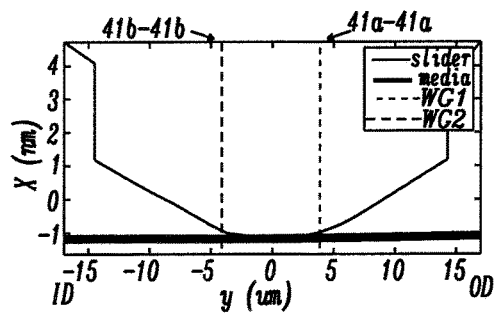
Figure 14B:
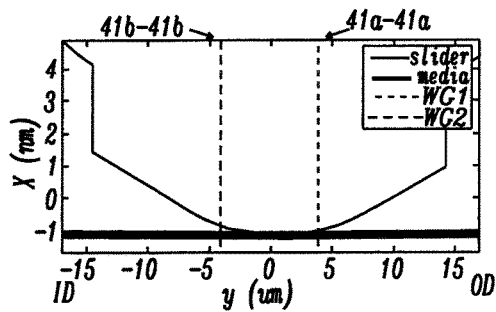
Figure 15A:
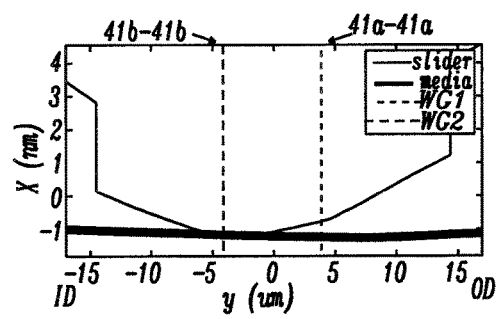
Figure 15B:
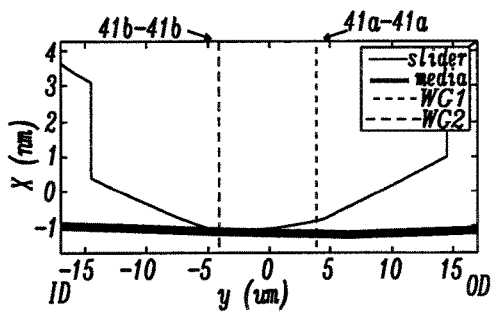

Referring to FIGS. 13A, 14A, 15A, the WDFH protrusion profile (WDFH-PTP) is shown for an up facing (UP) recording head configuration paired with an UP suspension for inner diameter (ID), middle diameter (MD), and outer diameter (OD) regions of the recording track, respectively. FIGS. 13B, 14B, 15B illustrate WDFH-PTP profiles for a down facing (DN) recording head paired with a DN suspension for ID, MD, and OD regions, respectively. As indicated in FIG. 7 in related patent application Ser. No. 15/942,756, writer 1 (or writer 2) may be an "inner" writer that is closer to the recording disk center than an "outer" writer depending on whether an UP recording head is paired with an UP suspension, or a DN recording head in dual PMR writer structure is paired with a DN suspension. Our simulation results show both PMR writers have near zero spacing loss in ID and MD track regions for a rDWS BGC base writer structure. However, writer 1 at plane 41a-41a has up to a 5 Angstrom spacing loss in OD regions of the recording track when WDFH is activated in either of an UP or DN recording head configuration. Accordingly, this magnitude of magnetic spacing loss would mean a poor performance bias for this dual PMR writer at OD skew.

Although the write current induced protrusion profile (Iw-PTP) due to bucking coil and driving coil heating will also contribute to the total WG protrusion during a write process, Iw-PTP is typically substantially less than the WDFH-PTP and will not mitigate the detrimental effect of the magnetic spacing loss realized when considering only WDFH-PTP. Note that Iw-PTP may be enhanced by narrow BC arms 60n1, 60n2, and narrow DC arms 61n1, 61n2 in the coil design depicted in FIGS. 6A-6B. However, WDFH-PTP will still be the dominant factor in determining total WG protrusion and magnetic spacing loss in the example shown in FIG. 12. Thus, a single WDFH has a parabolic cross-track protrusion profile that is at the center of the slider (0 um cross-track position) in ID and MD track regions, and is proximate to the center plane in OD track regions, and has significant magnetic spacing loss in each case.

TABLE 1

WDFH-PTP simulation results in a dual PMR writer with a rDWS BGC base writer structure

Figure 16A:
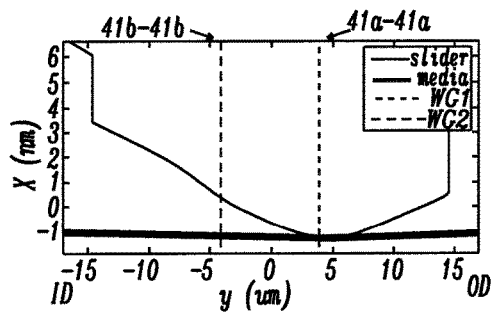
FIG. 16A, FIG. 17A, and FIG. 18A are WG protrusion profiles for an outer (first) writer in a dual PMR writer at ID, MD, and OD, respectively.
Figure 16B:
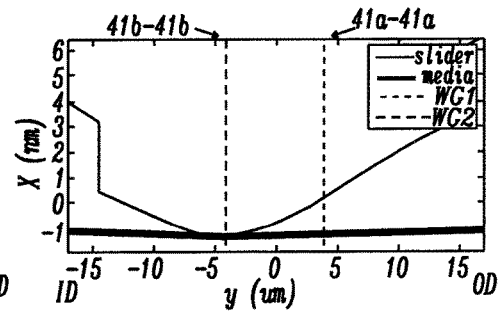
FIG. 16B, FIG. 17B, and FIG. 18B are WG protrusion profiles for an inner (second) writer in the dual PMR writer wherein the first and second writers each have a dedicated DFH heater coil according to an embodiment of the present disclosure.
Figure 17A:
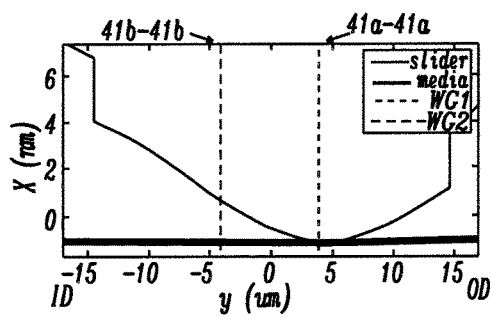
Figure 17B:
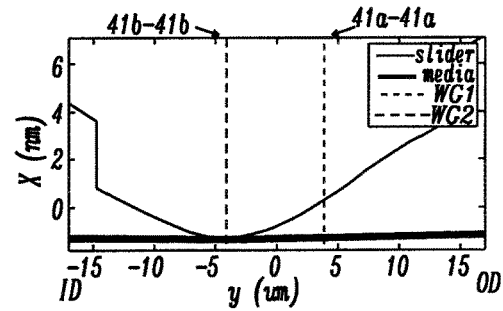
Figure 18A:
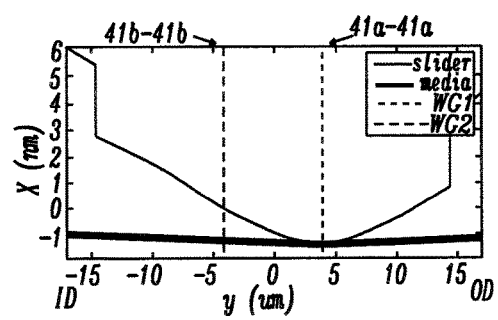
Figure 18B:
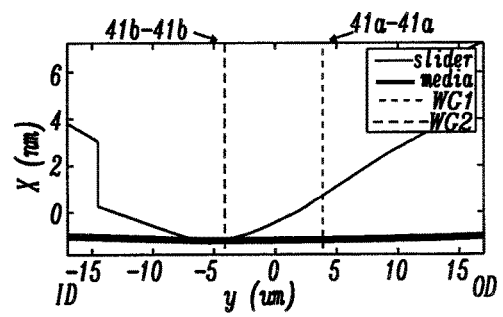
Figure 19A:
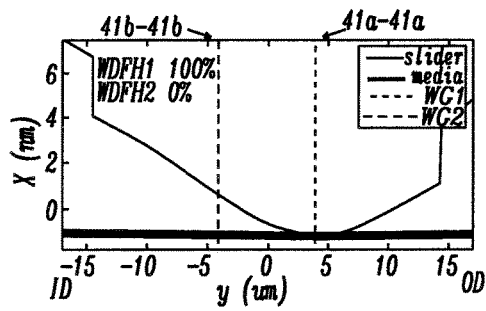
FIGS. 19A-19F are plots showing a capability to shift the contact point of the dual PMR writer in the embodiment relating to FIGS. 16A-16B, FIGS. 17A-17B, and FIGS. 18A-18B by adjusting the power level in the two dedicated DFH heater coils.
Figure 19B:
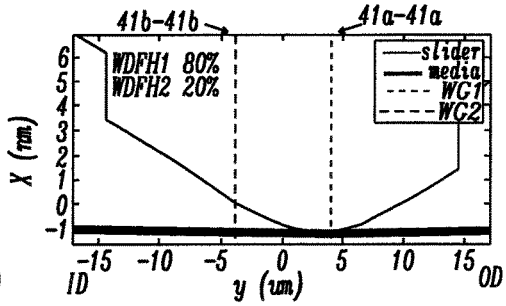
Figure 19C:
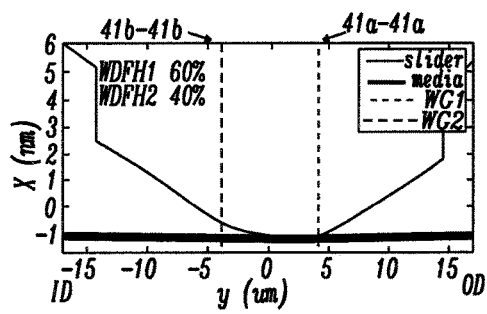
Figure 19D:
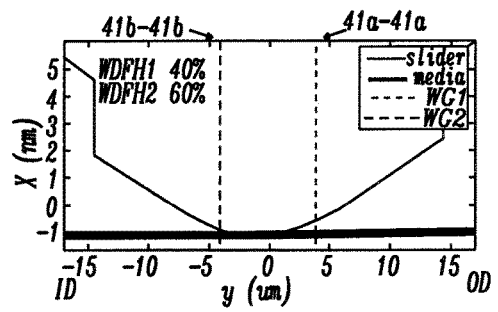
Figure 19E:
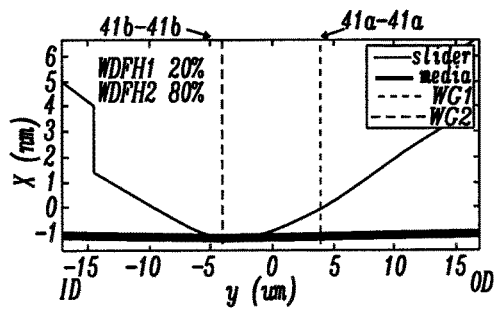
Figure 19F:
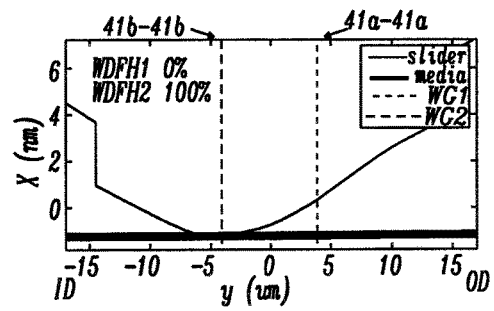
Figure 20A:
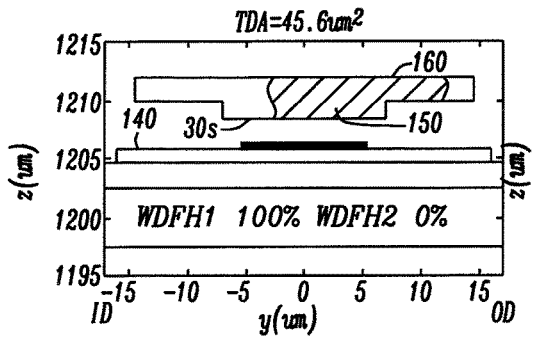
FIGS. 20A-20F are plots showing a capability to control the size of the touchdown area of the dual PMR writer in the embodiment relating to FIGS. 16A-16B, FIGS. 17A-17B, and FIGS. 18A-18B by adjusting the power level in the two dedicated DFH heater coils.
Figure 20B:
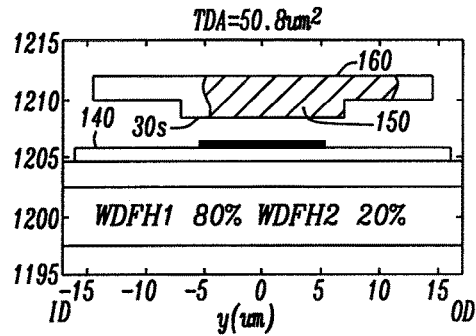
Figure 20C:
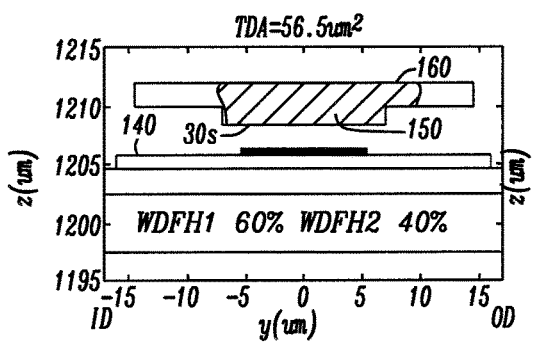
Figure 20D:
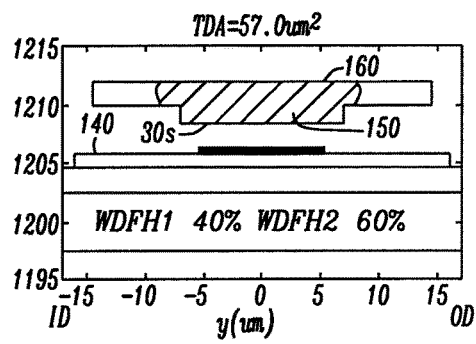
Figure 20E:
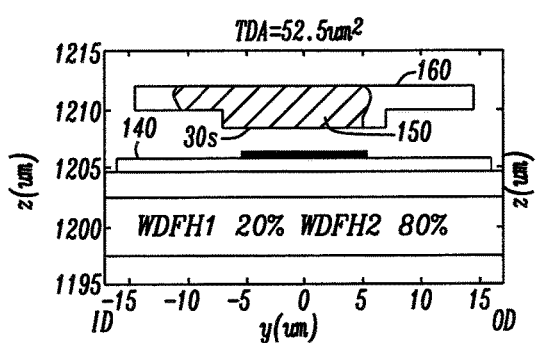
Figure 20F:
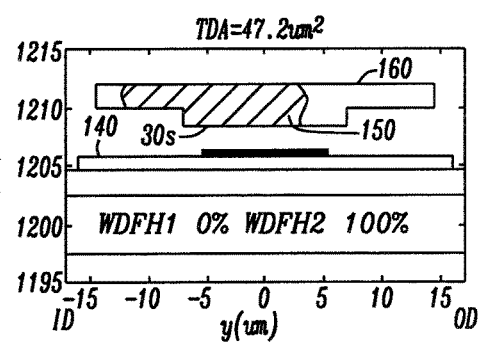

| Writer base structure | WDFH heater | Track region | Example | $FH_{WG1}$ (nm) | $FH_{WG2}$ (nm) | $FH_{min}$ (nm) |
|---|---|---|---|---|---|---|
| rDWS BGC | Single | ID | FIG. 13A | 0.14 | 0.17 | 0.05 |
| rDWS BGC | Single | MD | FIG. 14A | 0.18 | 0.23 | 0.02 |
| rDWS BGC | Single | OD | FIG. 15A | 0.51 | 0.02 | 0.02 |
| rDWS BGC | Single | ID | FIG. 13B | 0.08 | 0.24 | 0.04 |
| rDWS BGC | Single | MD | FIG. 14B | 0.13 | 0.32 | 0.03 |
| rDWS BGC | Single | OD | FIG. 15B | 0.40 | 0.04 | 0.03 |
| rDWS BGC | WDFH1 | ID | FIG. 16A | 0.02 | 1.56 | 0.00 |
| rDWS BGC | WDFH2 | ID | FIG. 16B | 1.42 | 0.01 | 0.00 |
| rDWS BGC | WDFH1 | MD | FIG. 17A | 0.02 | 1.73 | 0.00 |
| rDWS BGC | WDFH2 | MD | FIG. 17B | 1.58 | 0.02 | 0.00 |
| rDWS BGC | WDFH1 | OD | FIG. 18A | 0.01 | 1.12 | 0.00 |
| rDWS BGC | WDFH2 | OD | FIG. 18B | 1.98 | 0.10 | 0.04 |

In Table 1, data associated with the single WDFH protrusion profile results is listed in the first six rows and includes fly height at plane 41a-41a in writer 1 ($FH_{WG1}$), fly height at plane 41b-41b in writer 2 ($FH_{WG2}$), and minimum fly height ($FH_{min}$) at the ABS. The bottom six rows in Table 1 relate to simulated WDFH protrusion profile results for a dual WDFH heater coil depicted in the first embodiment (FIG. 8). FIG. 16A and FIG. 16B are WDFH1-PTP and WDFH2-PTP results, respectively, at an ID track region; FIG. 17A and FIG. 17B are WDFH1-PTP and WDFH2-PTP results, respectively, at a MD track region; and FIG. 18A and FIG. 18B are WDFH1-PTP and WDFH2-PTP results, respectively, at an OD track region. The base writer structure as well as the BC and DC coil design is retained from the previous FEM study with the single WDFH reference example. We have found the dual WDFH heater coil of the present disclosure is able to essentially eliminate writer spacing loss observed with a single WDFH heat coil as evidenced by a maximum magnetic spacing loss ($FH_{WG2}-FH_{min}$)=0.06 nm (0.6 Angstroms) for writer 2 at the OD track region. In comparison, ($FH_{WG1}-FH_{min}$) is 0.37 nm (row 6) or 0.49 nm (row 3) for writer 1 at the OD track region when a single WDFH is employed in a dual PMR writer.

The present disclosure also encompasses a method of tuning the close point in the cross-track direction during a write process with a selected writer in a dual PMR writer structure to further minimize magnetic spacing loss and improve performance. Instead of activating only WDFH1 when writer 1 is selected for writing, or activating only WDFH2 when writer 2 is selected for writing, both WDFH1 and WDFH2 are activated when either writer 1 or writer 2 is selected. In particular, the relative power levels applied to WDFH1 and WDFH2 may be adjusted between a WDFH1:WDFH2 ratio of 100:0 and 0:100 and applies to both of the first embodiment (FIG. 8) and the second embodiment (FIG. 9).

The recent development of diamond-like carbon (DLC) in the slider process is moving toward the reduction of surface energy and interface friction. This technology could interfere with the declaration of the contact detect point and lead to main pole wear and reliability issues. The contact detect point variation for individual heads is further compounded by different touchdown detection schemes and recording disks by various customers. To retain the maximum flexibility of wafer thermal-mechanical and slider air-bearing design, the WDFH1:WDFH2 power ratio is beneficial in controlling the slider ABS surface to adjust the position of the contact area in write-mode touchdown.

FIGS. 19A-19D show the effect on the WDFH protrusion profile for WDFH1/WDFH2 power ratios of 100:0, 80:20, 60:40, 40:60, 20:80, and 0:100, respectively. Thus, the close point may be fined tuned in the exemplary embodiment by varying the WDFH1/WDFH2 power ratio. This embodiment is especially advantageous in an example such as in FIG. 18B (writer 2 with only WDFH2 activated) where the close point ($FH_{min}$) is a greater distance than plane 41b-41b from the center cross-track position (at plane 41c-41c). Thus, by increasing the WDFH1:WDFH2 power ratio from a 0:100 ratio used in the FIG. 18B simulation, to a WDFH1:WDFH2 power ratio of 5:95, for instance, the close point is adjusted closer to plane 41b-41b and will reduce the magnetic spacing loss. Alternatively, if the close point when writing with writer 1 is a greater distance from the center track position than plane 41a-41a, a certain amount of power could be applied to WDFH2 to change the WDFH1:WDFH2 power ratio from 100:0 to 95:5, for example, and bring the close point closer to plane 41a-41a to reduce the magnetic spacing loss.

Referring to FIGS. 20A-20F, the method of activating both WDFH1 and WDFH2 when either of writer 1 or writer 2 is selected for a write process in order to adjust the close point in the cross-track direction may also be employed to regulate the size of the touchdown area. As the WDFH1:WDFH2 power ratio approaches 50:50 with the 60:40 and 40:60 examples, the touchdown area (TDA) size is at a maximum (57 $\mu m^2$) that is at least 20% greater than a minimum value (45.6 $\mu m^2$) observed for a power ratio of 100:0 or 0:100 according to our FEM study. In the drawings, the upper shape 160 is the magnetic shield boundary, and the striped region 150 within represents the area with highest amount of thermal expansion due to heating from one or both of WDFH1 and WDFH2. As a result, all or a portion of ABS surface 30s makes contact (not shown) with the magnetic medium (disk) 140 during a write process depending on the power ratio. Accordingly, the power ratio adjustment of this embodiment ensures a minimum TDA required for reliable head/disk interface but also enables a reduction of TDA in situations where a larger TDA may jeopardize performance without an improved reliability benefit.

The process flow of fabricating a dual PMR writer structure according to the present disclosure preferably involves the same number of process steps used to build a single PMR writer in order to maintain cost. Key steps are described in related patent application Ser. No. 15/966,192, but are not included herein. The present disclosure ensures that plane 41a-41a or plane 41b-41b in the selected writer 1 or writer 2, respectively, will be the "peak" of the parabolic WG protrusion shape due to the dual WDFH design and thereby minimize magnetic spacing loss.

While the present disclosure has been particularly shown and described with reference to, the preferred embodiment thereof, it will be understood by those skilled in the art that various changes in form and details may be made without departing from the spirit and scope of this disclosure.

We claim:

1. A dual perpendicular magnetic recording (PMR) writer, comprising:
   (a) a first main pole layer in a first PMR writer having a first main pole tip with a leading side and trailing side at an air bearing surface (ABS), and bisected by a first plane that is at a first cross-track position and is orthogonal to the ABS, and wherein the first PMR writer is formed on a slider;
   (b) a second main pole layer in a second PMR writer formed on the slider, and having a second main pole tip with a leading side and trailing side at the ABS, and bisected by a second plane that is orthogonal to the ABS, wherein the first and second planes are equidistant from a center plane that separates the first and second PMR writers;
   (c) a bucking coil (BC) that is formed below the first and second main pole layers, and is recessed from the ABS, and wherein the bucking coil is connected to a driving coil by an interconnect;
   (d) the driving coil (DC) that is formed above the first and second main pole layers, is recessed from the ABS, and contacts a top surface of the interconnect;
   (e) a first dynamic fly height (DFH) heater coil (WDFH1) formed in the first PMR writer, and between the bucking coil and the driving coil; and
   (f) a second DFH heater coil (WDFH2) formed in the second PMR writer, and between the bucking coil and the driving coil, wherein WDFH1 and WDFH2 are configured to adjust a close point proximate to the first plane when the first PMR writer is selected for a write process, and to adjust the close point proximate to the second plane when the second PMR writer is selected for a write process.

2. The dual PMR writer of claim 1 wherein the bucking coil has a BC first outer portion in the first PMR writer, a BC second outer portion in the second PMR writer, and a BC center portion at the center plane, and wherein the interconnect adjoins a backend of the BC center portion.

3. The dual PMR writer of claim 2 wherein the driving coil has a DC first outer portion in the first PMR writer, a DC second outer portion in the second PMR writer, and a DC center portion at the center plane, and wherein the interconnect adjoins a backend of the DC center portion.

4. The dual PMR writer of claim 3 wherein the write process with the first PMR writer comprises sending a write current through the DC first outer portion, DC center portion, interconnect, BC center portion, and BC first outer portion, and activating at least WDFH1 by sending a current from a WDFH1+ heater pad through WDFH1 to a ground (H/G) pad at the center plane.

5. The dual PMR writer of claim 4 wherein WDFH1 has an outer portion connected to the WDFH1+ heater pad, a front side that is recessed behind a first back gap connection (BGC) in the first PMR writer, and an inner portion having a serpentine shape that extends from the front side to a first backside behind the interconnect, and wherein the first backside adjoins a second backside of WDFH2 at a backend at the center plane.

6. The dual PMR writer of claim 3 wherein the write process with the second PMR writer comprises sending a write current through the DC second outer portion, DC center portion, interconnect, BC center portion, and BC second outer portion, and activating at least WDFH2 by sending a current from a WDFH2+ heater pad through WDFH2 to a H/G pad.

7. The dual PMR writer of claim 6 wherein WDFH2 has an outer portion connected to the WDFH2+ heater pad, a front side that is recessed behind a second BGC in the second PMR writer, and an inner side having a serpentine shape that extends from the WDFH2 front side to a second backside behind the interconnect, and wherein the second backside adjoins a first backside of WDFH1 at a backend at the center plane.

8. The dual PMR writer of claim 1 wherein WDFH1 and WDFH2 have a cross-track footprint less than a cross-track footprint of the bucking coil.

9. The dual PMR writer of claim 1 wherein WDFH1 and WDFH2 are made of Cu, W, or Ta and have a thickness from about 400 Angstroms to 1000 Angstroms.

10. The dual PMR writer of claim 1 wherein a first power is applied to WDFH1 and a second power is applied to WDFH2 to give a WDFH1:WDFH2 power ratio that is from 100:0 to 0:100 in order to adjust a close point of a touchdown area at the ABS and along a cross-track direction that is toward the first plane when the first PMR writer is selected for the write process, or toward the second plane when the second PMR writer is selected for the write process.

11. The dual PMR writer of claim 10 wherein the WDFH1:WDFH2 power ratio further adjusts a size of the touchdown area.

12. A head gimbal assembly (HGA) comprising a suspension on which the slider of claim 1 is formed, and wherein the suspension comprises a load beam with one end connected to a flexure, and a base plate connected to the other end of the load beam.

13. A magnetic recording apparatus, comprising:
(a) the HGA according to claim 12;
(b) a magnetic recording medium positioned opposite to the slider;
(c) a spindle motor that rotates and drives the magnetic recording medium; and
(d) a device that supports the slider, and that positions the slider relative to the magnetic recording medium.

14. A dual perpendicular magnetic recording (PMR) writer, comprising:
(a) a first main pole layer in a first PMR writer having a first main pole tip with a leading side and trailing side at an air bearing surface (ABS), and bisected by a first plane that is at a first cross-track position and is orthogonal to the ABS, and wherein the first PMR writer is formed on a slider;
(b) a second main pole layer in a second PMR writer formed on the slider, and having a second main pole tip with a leading side and trailing side at the ABS, and bisected by a second plane that is orthogonal to the ABS, wherein the first and second planes are equidistant from a center plane that separates the first and second PMR writers;
(c) a first bucking coil that is formed below the first main pole layer in the first PMR writer, and is connected to a first driving coil or a common driving coil with a first interconnect;
(d) a second bucking coil formed below the second main pole layer in the second PMR writer; and is connected to a second driving coil or the common driving coil with a second interconnect;
(e) a first dynamic fly height (DFH) heater coil (WDFH1) formed above the first bucking coil in the first PMR writer; and
(f) a second DFH heater coil (WDFH2) formed above the second bucking coil in the second PMR writer, wherein WDFH1 and WDFH2 are configured to adjust a close point proximate to the first plane when the first PMR writer is selected for a write process, and to adjust the close point proximate to the second plane when the second PMR writer is selected for a write process.

15. The dual PMR writer of claim 14 wherein a write process with the first PMR writer comprises sending a write current through the first bucking coil, first interconnect, and through the first driving coil or common driving coil, and activating WDFH1 by sending a current from a WDFH1+ heater pad through WDFH1 to a ground (H/G) pad at the center plane.

16. The dual PMR writer of claim 15 wherein WDFH1 has an outer portion connected to the WDFH1+ heater pad, a front side that is recessed behind the first interconnect, and a center portion having a serpentine shape that extends from the WDFH1 front side to a first backside, and wherein the first backside adjoins a second backside of WDFH2 at the center plane.

17. The dual PMR writer of claim 14 wherein a write process with the second PMR writer comprises sending a write current through the second bucking coil, second interconnect, and through the second driving coil or common driving coil, and activating WDFH2 by sending a current from a WDFH2+ heater pad through WDFH2 to a H/G pad at the center plane.

18. The dual PMR writer of claim 17 wherein WDFH2 has an outer portion connected to the WDFH2+ heater pad, a front side that is recessed behind the second interconnect, and a center portion having a serpentine shape that extends from the WDFH2 front side to a second backside, and wherein the second backside adjoins a first backside of WDFH1 at the center plane.

19. The dual PMR writer of claim 14 wherein WDFH1 and WDFH2 are made of Cu, W, or Ta, and have a thickness from about 400 Angstroms to 1000 Angstroms.

20. The dual PMR writer of claim 14 wherein a first power is applied to WDFH1 and a second power is applied to WDFH2 to give a WDFH1:WDFH2 power ratio that is from 100:0 to 0:100 in order to adjust a close point of a touchdown area at the ABS and along a cross-track direction that is toward the first plane when the first PMR writer is selected for the write process, or toward the second plane when the second PMR writer is selected for the write process.

21. The dual PMR writer of claim 20 wherein the WDFH1:WDFH2 power ratio also adjusts a size of the touchdown area.

22. A head gimbal assembly (HGA) comprising a suspension on which the slider of claim 14 is formed, and wherein the suspension comprises a load beam with one end connected to a flexure, and a base plate connected to the other end of the load beam.

23. A magnetic recording apparatus, comprising:
(a) the HGA according to claim 22;
(b) a magnetic recording medium positioned opposite to the slider;
(c) a spindle motor that rotates and drives the magnetic recording medium; and
(d) a device that supports the slider, and that positions the slider relative to the magnetic recording medium.

24. A method of adjusting a write gap (WG) protrusion close point position during a write process with a first perpendicular magnetic recording (PMR) writer, or during a write process with a second PMR writer in a dual PMR writer; comprising:
(a) providing a first main pole in the first PMR writer with a first main pole tip which is bisected by a first plane that is orthogonal to an air bearing surface (ABS);
(b) providing a second main pole in the second PMR writer with a second main pole tip that is bisected by a second plane that is orthogonal to the ABS, and wherein the first and second planes are equidistant from a center plane that separates the first and second PMR writers on a slider in a head gimbal assembly (HGA);
(c) providing a first circuit comprised of a bucking coil portion, a driving coil portion, and an interconnect between the BC and DC portions in the first circuit through which a write current is sent to activate the first PMR writer for a write process;
(d) providing a second circuit comprised of a bucking coil portion, a driving coil portion, and the interconnect between the BC and DC portions in the second circuit through which a write current is sent to activate the second PMR writer for a write process;
(e) forming a first dynamic fly height (DFH) heater coil (WDFH1) between the BC and DC portions in the first circuit, and a second DFH heater coil (WDFH2) between the BC and DC portions in the second circuit so that at least WDFH1 is activated during a write process with the first PMR writer, and at least WDFH2 is activated during a write process with the second PMR writer; and
(f) applying a first power to WDFH1 and a second power to WDFH2 to give a WDFH1:WDFH2 power ratio from 100:0 to 0:100 that adjusts the close point position toward the first plane during a write process with the first PMR writer, or toward the second plane during a write process with the second PMR writer.

25. The method of claim 24 wherein the BC portion in the first PMR writer comprises a BC first outer portion, and a BC center portion that is connected to the interconnect at the center plane, and the BC portion in the second PMR writer comprises the BC center portion and a BC second outer portion, and wherein the DC portion in the first PMR writer comprises a DC first outer portion, and a DC center portion connected to the interconnect, and the DC portion in the second PMR writer comprises a DC second outer portion and the DC center portion.

26. The method of claim 25 wherein the first circuit comprises the BC first outer portion, BC center portion, interconnect, DC center portion, and DC first outer portion, and wherein the second circuit comprises the BC second outer portion, BC center portion, interconnect, DC center portion, and DC second outer portion.

27. The method of claim 24 wherein the first power is applied by sending a current from a WDFH1+ heater pad through WDFH1 to a ground (H/G) pad, and wherein the second power is applied by sending a current from a WDFH2+ heater pad through WDFH2 to the H/G pad.

28. The method of claim 27 wherein WDFH1 has an outer portion connected to the WDFH1+ heater pad, a front side that is recessed behind a first back gap connection (BGC) in the first PMR writer, and an inner portion having a serpentine shape that extends from the WDFH1 front side to a first backside behind the interconnect, and wherein the first backside adjoins a second backside of WDFH2 at a backend connected to the H/G pad at the center plane.

29. The method of claim 27 wherein WDFH2 has an outer portion connected to the WDFH2+ heater pad, a front side that is recessed behind a second BGC in the second PMR writer, and an inner side having a serpentine shape that extends from the WDFH2 front side to a second backside behind the interconnect, and wherein the second backside adjoins a first backside of WDFH1 at a backend connected to the H/G pad at the center plane.

30. The method of claim 24 wherein the WDFH1: WDFH2 power ratio also adjusts a size of a touchdown area of the dual PMR writer during the write process with the first PMR writer or with the second PMR writer.

* * * * *